(12) United States Patent
Jo et al.

(10) Patent No.: US 11,946,651 B2
(45) Date of Patent: Apr. 2, 2024

(54) PORTABLE AIR FLOW APPARATUS

(71) Applicant: LG ELECTRONICS INC., Seoul (KR)

(72) Inventors: Yu Na Jo, Seoul (KR); Deukwon Lee, Seoul (KR); Taeyun Lee, Seoul (KR); Hyunbyung Cha, Seoul (KR); Sang Yoon Lee, Seoul (KR); Min Kyu Oh, Seoul (KR); Byunghoon Park, Seoul (KR); Yeon A Jo, Seoul (KR); Chang On Lee, Seoul (KR); Jihye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/584,630

(22) Filed: Jan. 26, 2022

(65) Prior Publication Data
US 2022/0282874 A1 Sep. 8, 2022

(30) Foreign Application Priority Data

Mar. 8, 2021 (KR) .......................... 10-2021-0030338
Apr. 27, 2021 (KR) .......................... 10-2021-0054479

(51) Int. Cl.
*F24C 15/20* (2006.01)
*A47J 36/38* (2006.01)
(Continued)

(52) U.S. Cl.
CPC .......... *F24C 15/2092* (2013.01); *A47J 36/38* (2013.01); *B01D 46/0038* (2013.01);
(Continued)

(58) Field of Classification Search
CPC .............. F24C 15/2092; F24C 15/2035; F24C 15/2085; A47J 36/38; B01D 46/0038;
(Continued)

(56) References Cited

U.S. PATENT DOCUMENTS 2,253,127 A * 8/1941 Koch .................... F04D 25/105
416/100
3,886,560 A * 5/1975 Mortensen ............. H01Q 1/084
343/709
(Continued)

FOREIGN PATENT DOCUMENTS

| CN | 202109563 | 1/2012 |
|---|---|---|
| CN | 108397808 | 8/2018 |

(Continued)

OTHER PUBLICATIONS

European Search Report dated Nov. 3, 2022 issued in EP Application No. 22152272.5.
(Continued)

*Primary Examiner* — Sizo B Vilakazi
*Assistant Examiner* — Susan E Scharpf
(74) *Attorney, Agent, or Firm* — KED & ASSOCIATES

(57) ABSTRACT

A portable air flow apparatus may include a base configured to be seated on a surface, a head comprising a suction inlet through which air is suctioned into the head and a discharge outlet through which the air suctioned in through the suction inlet is discharged, the suction inlet and the discharge outlet being horizontally spaced apart from each other at a right angle with respect to a vertical direction, and a column that connects the head and the base in such a manner that the head is vertically spaced from the base.

20 Claims, 45 Drawing Sheets

(51) Int. Cl.
  *B01D 46/00* (2022.01)
  *B01D 46/16* (2006.01)
  *F04D 17/16* (2006.01)
  *F04D 25/06* (2006.01)
  *F04D 27/00* (2006.01)
  *F04D 29/053* (2006.01)
  *F04D 29/40* (2006.01)
  *F04D 29/42* (2006.01)
  *F04D 29/70* (2006.01)

(52) U.S. Cl.
  CPC ......... *B01D 46/16* (2013.01); *F04D 25/0606* (2013.01); *F04D 27/00* (2013.01); *F04D 29/053* (2013.01); *F04D 29/403* (2013.01); *F04D 29/4293* (2013.01); *F04D 29/70* (2013.01); *F04D 29/701* (2013.01); *F04D 29/703* (2013.01); *F24C 15/2035* (2013.01); *F24C 15/2085* (2013.01); *B01D 2279/35* (2013.01); *F04D 17/16* (2013.01)

(58) Field of Classification Search
  CPC ..... B01D 46/16; B01D 2279/35; F04D 27/00; F04D 29/053; F04D 29/403; F04D 29/4293; F04D 29/70; F04D 29/701; F04D 29/703; F04D 17/16; F04D 25/0606; F05D 2260/32
  See application file for complete search history.

(56) References Cited

U.S. PATENT DOCUMENTS

| | | | | |
|---|---|---|---|---|
| 5,603,562 | A * | 2/1997 | Huang | F21S 6/007 362/183 |
| 6,497,738 | B2 * | 12/2002 | Lin | B01D 46/10 126/299 R |
| 7,380,759 | B1 * | 6/2008 | Whiteside | F16M 11/041 248/221.11 |
| 9,624,944 | B2 * | 4/2017 | Ojeda | F04D 17/04 |
| 2002/0088211 | A1 * | 7/2002 | Lin | B01D 46/10 55/385.1 |
| 2003/0033937 | A1 * | 2/2003 | Najm | B01D 46/446 96/429 |
| 2004/0129139 | A1 * | 7/2004 | Schumacher | B60H 3/06 55/354 |
| 2007/0204854 | A1 * | 9/2007 | Morton | F24C 15/2035 126/299 D |
| 2016/0281742 | A1 * | 9/2016 | Rivera | F04D 25/0673 |
| 2020/0398207 | A1 * | 12/2020 | Park | B01D 46/0032 |
| 2021/0121816 | A1 * | 4/2021 | Kim | B01D 46/4245 |
| 2022/0282874 | A1 * | 9/2022 | Jo | B01D 46/16 |
| 2022/0341598 | A1 * | 10/2022 | Lee | F24C 15/2092 |
| 2022/0373190 | A1 * | 11/2022 | Lee | F24C 15/2092 |

FOREIGN PATENT DOCUMENTS

| | | |
|---|---|---|
| CN | 110360631 | 10/2019 |
| CN | 112283774 | 1/2021 |
| CN | 112555922 | 3/2021 |
| DE | 3503236 | 8/1986 |
| DE | 10 2004 055947 | 7/2006 |
| DE | 10 2005 055 029 | 5/2007 |
| DE | 20 2015 106 627 | 1/2016 |
| DE | 20 2016 002873 | 7/2016 |
| EP | 3 502 572 | 6/2019 |
| FR | 2 761 620 | 10/1998 |
| JP | 48-97490 | 11/1973 |
| JP | 62-17737 | 2/1987 |
| JP | 2002-286268 | 10/2002 |
| KR | 20-0321802 | 7/2003 |
| KR | 20-0394656 | 9/2005 |
| KR | 10-0819482 | 4/2008 |
| KR | 10-2016-0104514 | 9/2016 |
| KR | 10-2017-0105333 | 9/2017 |
| KR | 10-2017-0137335 | 12/2017 |
| KR | 10-2018-0058047 | 5/2018 |
| KR | 10-2018-0099392 | 9/2018 |
| KR | 10-2018-0099393 | 9/2018 |
| KR | 20-0487625 | 12/2018 |
| KR | 10-1961013 | 3/2019 |
| KR | 10-1962730 | 3/2019 |
| KR | 10-2019-0087809 | 7/2019 |
| KR | 10-2051551 | 12/2019 |
| KR | 10-2021-0022253 | 3/2021 |
| KR | 10-2022-0018280 | 2/2022 |

OTHER PUBLICATIONS

International Search Report issued in Application No. PCT/KR2021/019328 dated Mar. 24, 2022.
International Search Report issued in Application No. PCT/KR2022/000188 dated Apr. 18, 2022.
International Search Report issued in Application No. PCT/KR2022/000995 dated Apr. 22, 2022.
Partial European Search Report issued in Application No. 22152272.5 dated Jun. 20, 2022.
European Search Report issued in Application No. 22153079.3 dated Jun. 28, 2022.
European Search report issued in Application No. 22158438.6 dated Jul. 22, 2022.
U.S. Appl. No. 17/580,751, filed Jan. 21, 2022.
U.S. Appl. No. 17/677,035, filed Feb. 22, 2022.
U.S. Appl. No. 17/584,630, filed Jan. 26, 2022.
European Office Action issued in Application No. 22152272.5 dated Jun. 14, 2023.
European Search Report issued in Application No. 22 153 079.3 dated Feb. 12, 2024.

* cited by examiner

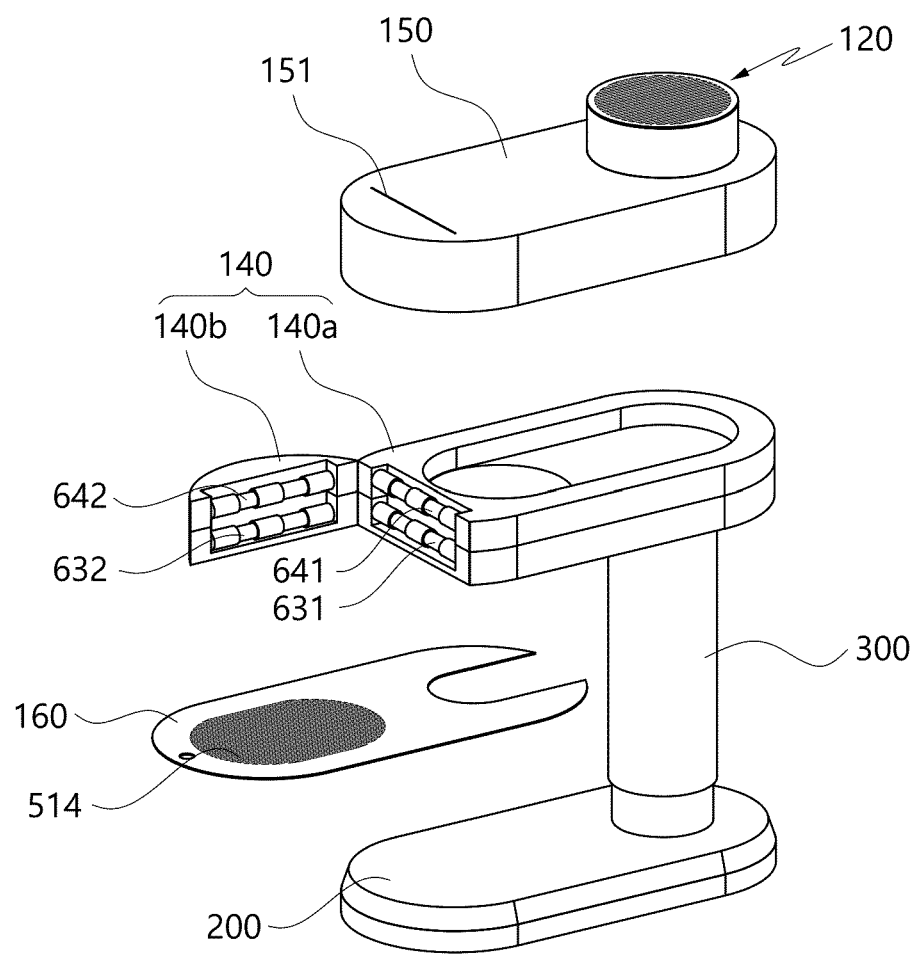

PORTABLE AIR FLOW APPARATUS

CROSS-REFERENCE TO RELATED APPLICATION(S)

The present application claims priority to Korean Patent Applications No. 10-2021-0054479, filed in Korea on Apr. 27, 2021, and No. 10-2021-0030338, filed in Korea on Mar. 8, 2021, the entire contents of which are hereby incorporated by reference.

BACKGROUND

1. Field

A portable air flow apparatus and a method for controlling a portable air flow apparatus are disclosed herein.

2. Background

Apparatuses that create an air flow are used indoors or outdoors. Typical examples of an air flow apparatus used indoors include a hood used during cooking of food or other items (hereinafter collectively "food") and an air purifier.

The hood is mounted over cooking heating equipment, such as a gas range or an induction stove. The hood suctions odors, water vapor, oil mist, and fine dust (hereinafter, collectively referred to as "oil mist"), for example, that occur when food is being cooked using the cooking heating equipment and discharges the oil mist to the outside. A position of the cooking heating equipment, such as the gas range or the induction stove, is fixed. Usually, a position at which the hood is installed over the cooking heating equipment is also fixed.

Usually, due to a kitchen structure or for convenience during cooking, a fixed-type hood is installed over the cooking heating equipment at a somewhat great height from the cooking heating equipment. Therefore, in some cases, all of the oil mist produced during cooking is not removed because of a long distance between a position at which the cooking occurs and a suction inlet of the fixed-type hood.

The oil mist which is not removed by the hood flow indoors, and thus, causes odors or is adsorbed onto a wall, or furniture, for example, in a room. Thus, the wall and the furniture are stained with grease. In addition, the existing fixed-type hood may be used for the fixed-type cooking heating equipment, such as the gas range or the induction stove, but cannot be used when meat is grilled over a portable burner or when food is cooked outdoors, such as at a camping site.

BRIEF DESCRIPTION OF THE DRAWINGS

Embodiments will be described in detail with reference to the following drawings in which like reference numerals refer to like elements, and wherein:

FIGS. 10 to 16 are views illustrating a roll filter unit according to an embodiment;

DETAILED DESCRIPTION

Figure 1:
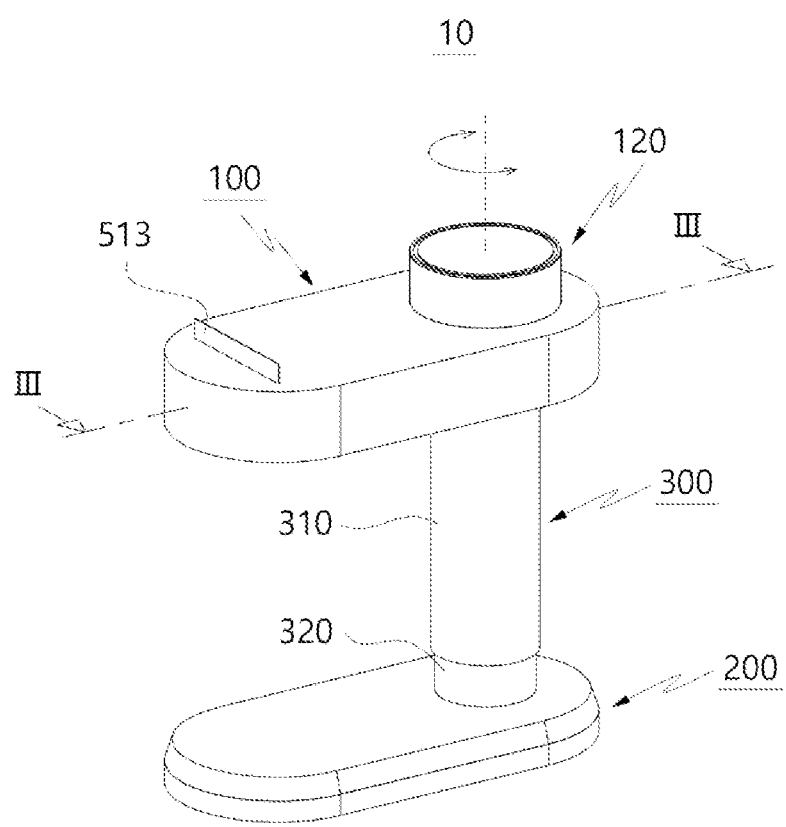
FIG. 1 is a perspective view of a portable air flow apparatus according to an embodiment.

Advantages and features of embodiments, and methods of achieving the advantages and the features will be apparent from embodiments that will be described below with reference to the accompanying drawings. However, the embodiments are not limited to the embodiments disclosed hereinafter, and will be practiced in various different forms. The embodiments are only provided to meet to the disclosure requirement and to make the scope of the disclosure fully noticeable to a person of ordinary skill in the art to which the embodiments pertains. The embodiments should be only defined by the claims. The same reference character throughout the specification refers to the same constituent element.

A portable air flow apparatus 10 according to an embodiment may be used as a portable hood during cooking of food or other items (hereinafter, collectively "food") and may be used as an air purifier for purifying indoor or outdoor air. A portable air flow apparatus according to an embodiment used as a portable hood is disclosed, followed by a portable air flow apparatus used as an air purifier.

The portable air flow apparatus 10 according to this embodiment, as illustrated in FIG. 1, may include a head unit or head 100, a base unit or base 200, and a columnar unit or column 300. The base 200 according to this embodiment may support the head 100, and the base 200 may be seated on a surface. According to this embodiment, a plate-like surface of the base 200 may have, for example, a shape of a race-track; however, embodiments are not limited to this shape.

The head 100 according to this embodiment may suction air into the portable air flow apparatus 10 and may discharge the suctioned air out of the portable air flow apparatus 10. According to this embodiment, the head 100 may include a suction inlet 110 and a discharge outlet 120.

Air may be suctioned in through the suction inlet 110. The air suctioned into the head 100 through the suction inlet 110 may be discharged through the discharge outlet 120.

According to this embodiment, for example, as illustrated in FIG. 1, the suction inlet 110 and the discharge outlet 120 may be formed spaced apart from each other at a right angle with respect to a vertical direction. That is, air may be suctioned into one side in a horizontal direction of a center of the head 100, and discharged through the discharge outlet 120 horizontally spaced apart from the suction inlet 110.

With this configuration, a bypass phenomenon that occurs when the suction inlet 110 and the discharge outlet 120 are coaxially positioned in the vertical direction is prevented, and thus, air suctioning efficiency may be improved. In the bypass phenomenon, due to a flow of air discharged through the discharge outlet 120 or due to heat generated during cooking, a portion of air flows along a periphery of the head 100 in a direction of the discharge outlet 120 without being introduced into the suction inlet 110.

According to this embodiment, for example, the head 100 may have a shape of a racetrack to correspond to the shape of the base 200. The suction inlet 110 may be formed at one or a first side in the horizontal direction of the head 100 having the shape of a racetrack, and the discharge outlet 120 may be formed in the other or a second side thereof, for example.

The column 300 according to this embodiment connects the head 100 and the base 200 to each other in such a manner that the head 100 is vertically spaced apart from the base 200. According to this embodiment, for example, the column 300 may be coupled with the head 100 such that it is spaced away from the suction inlet 110 in a direction of the discharge outlet 120. In addition, for example, the column 300 may be rotatably coupled with the base 200 such that the suction inlet 110 side of the head 100 may be rotated in a lateral direction.

With the above-described configuration, the head 100 may rotate about the column 300 coupled with the discharge outlet 120 side of the head 100, and the suction inlet 110 side of the head 100 which is horizontally spaced away from the discharge outlet 120 is rotatable in the lateral direction. Thus, a position of the suction inlet 110 is adjustable.

Figure 2A:
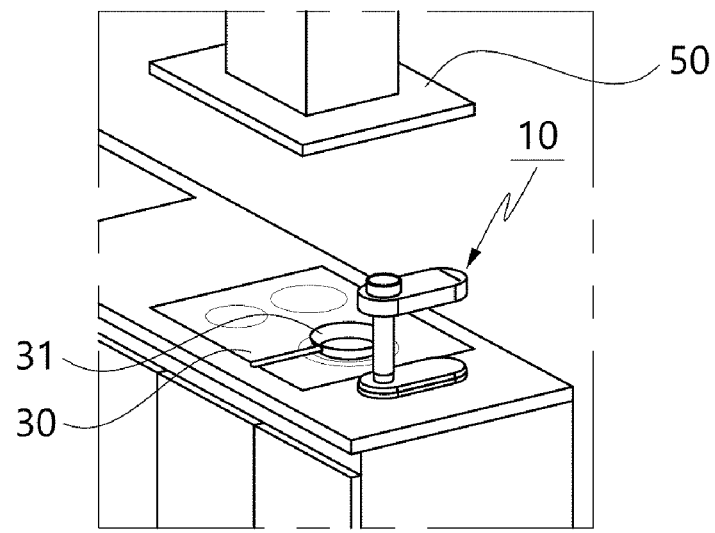
FIGS. 2A, 2B, and 2C are views illustrating states of use of the portable air flow apparatus according to an embodiment.
Figure 2B:
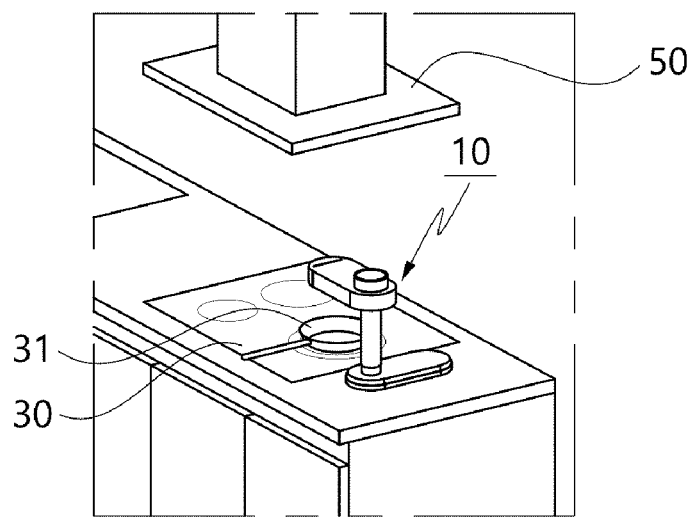
Figure 2C:
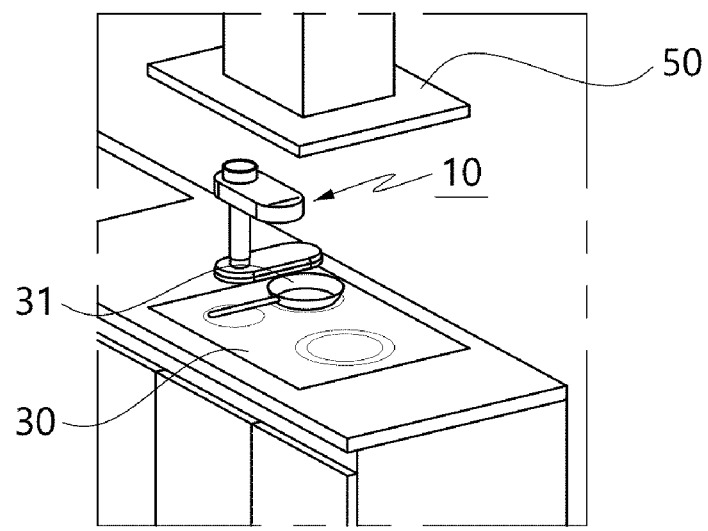

FIGS. 2A, 2B, and 2C are views illustrating states of use of the portable air flow apparatus 10 according an embodiment. FIGS. 2A, 2B, and 2C illustrate examples of use of the portable air flow apparatus in, for example, a kitchen in a house in which a stationary hood 50, such as an induction stove, is installed.

Use of the portable air flow apparatus 10 according to this embodiment is described with reference to FIGS. 2A, 2B, and 2C. When the portable air flow apparatus 10 is not in use, as illustrated in FIG. 2A, the head 100 may be rotated so that the head 100 and the base 200 are positioned in such a manner as to face each other. Thus, a space that is occupied by the base 200 and the head 100 may be minimized.

The portable air flow apparatus 10 according to this embodiment, as illustrated in FIGS. 2B, and 2C, may be seated to the left or right of cooking heating equipment 30 according to a position of an in-operation cooktop, among cooktops of the cooking heating equipment 30, such as an induction stove. In this state, the head 100 may be rotated in the lateral direction, and thus, a position of the suction inlet 110 of the head 100 may be adjusted in such a manner that the suction inlet 110 is positioned above a cooking utensil 31, such as a pot.

In this manner, according to a cooking environment, such as the position of the cooktop, the position of the suction inlet 110 may be adjusted such that the suction inlet 110 is positioned vertically adjacent to the cooking utensil 31. Thus, the suction inlet 110, while positioned vertically adjacent to the cooking utensil 31, may suction oil mist, for example, and suctioning efficiency may be effectively increased.

Figure 3:
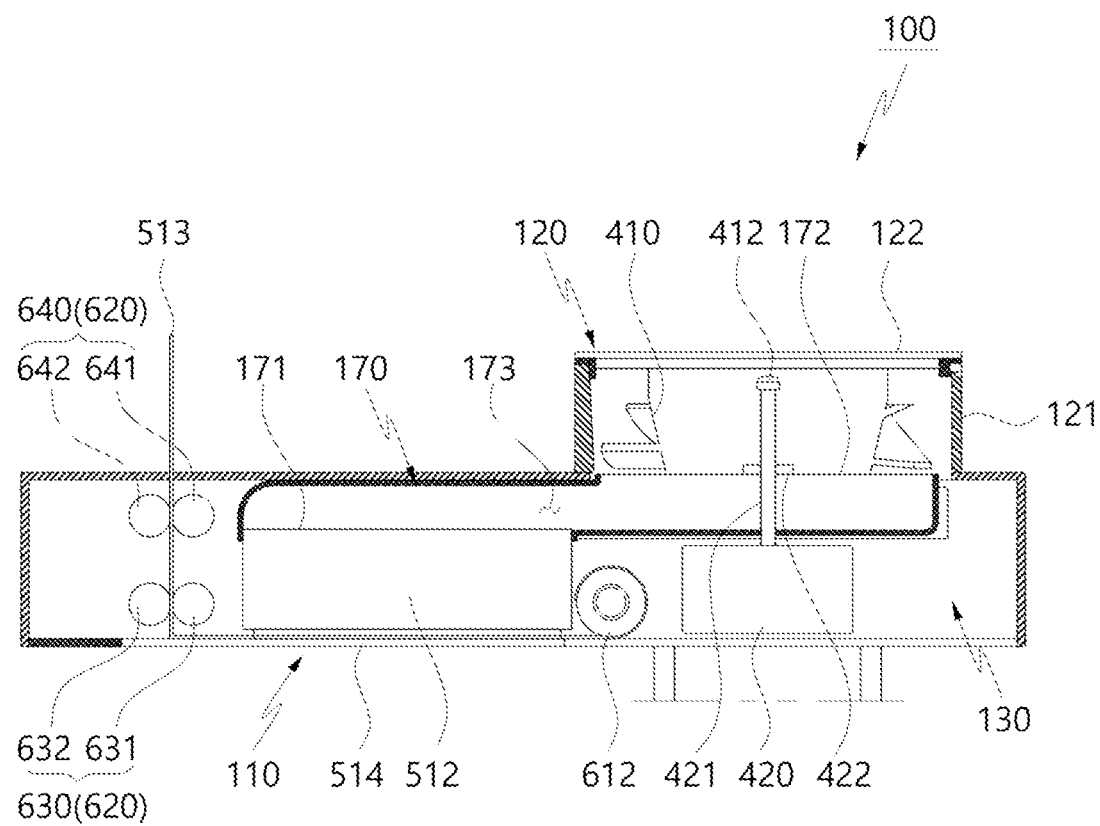
FIG. 3 is a cross-sectional view of a head, taken along line III-III in FIG. 1 according to an embodiment.

FIG. 3 is a cross-sectional view of a head according an embodiment. FIG. 3 illustrates a vertical cross-section of the head 100 in a direction from the suction inlet 110 to the discharge outlet 120.

In this case, for example, the suction inlet 110 according to this embodiment is open at a bottom, and thus, air is suctioned from below. The discharge outlet 120 may be open at a top, and thus, the air suctioned through the suction inlet 110 may be discharged upward.

With this configuration, as illustrated in FIGS. 2A, 2B, and 2C, the suction inlet 110, while positioned vertically adjacent to the cooking utensil 31, suctions oil mist, for example, from below. Thus, the suctioning efficiency may be improved. In addition, the suctioned oil mist, for example, may be discharged upward through the discharge outlet 120 horizontally spaced away from the suction inlet 110. Thus, as described above, the bypass phenomenon that occurs due to discharged air or heat generated by the cooking utensil 31 during cooking may be prevented.

In addition, the discharge outlet 120 has a structure that discharges the oil mist upward. As illustrated in FIGS. 2A, 2B, and 2C, the oil mist is discharged toward the stationary hood 50. Thus, the stationary hood 50 may participate in effectively removing the oil mist occurring during cooking.

In this case, according to this embodiment, for example, the suction inlet 110 and the discharge outlet 120 may be formed in the head 100 in such a manner as to be spaced apart from each other in order not to vertically overlap each other. That is, the suction inlet 110 and the discharge outlet 120 may be formed in the head 100 in such a manner that respective edge portions in a facing direction thereof do not overlap in the vertical direction. Accordingly, air suctioned toward the suction inlet 110 side of the head 100 and air discharged from the discharge outlet 120 side of the head 100 do not interfere with each other. Thus, suctioning and discharge efficiency may be improved.

The portable air flow apparatus 10 according to this embodiment, as illustrated in FIG. 3, may further include a discharge fan 410. The discharge fan 410 according to this embodiment may be mounted inside of the discharge outlet 120. The discharge fan 410 generates a suction force for introducing air through the suction inlet 110 and discharging the introduced air through the discharge outlet 120.

According to this embodiment, the discharge fan 410 may be mounted in the discharge outlet 120 side of the head 100, and thus, a center of gravity of the portable air flow apparatus 10 may be positioned in the column 300 side of the portable air flow apparatus 10 in which the discharge outlet 120 is formed. Accordingly, as illustrated in FIGS. 2A, 2B, and 2C, although the suction inlet 110 side of the head 100 is rotated in the lateral direction, the center of gravity is positioned on the column 300 side of the portable air flow apparatus 10. Thus, when the head 100 is rotated in the lateral direction, the portable air flow apparatus 10 according this embodiment may be prevented from falling over.

In addition, according to this embodiment, the portable air flow apparatus 10 may further include a fan motor 420. For example, the fan motor 420 may be mounted below the discharge fan 410 and rotate the discharge fan 410.

That is, the discharge fan 410 and the fan motor 420, as illustrated in FIG. 3, may be mounted in the head 100 in such a manner as to be positioned in the column 300 side of the portable air flow apparatus 10, for example, over the column 300. Accordingly, as described above, the center of gravity of the entire portable air flow apparatus 10 may be positioned in the column 300 side of the portable air flow apparatus 10. Thus, the portable air flow apparatus 10 may be prevented from falling over.

Figure 4:
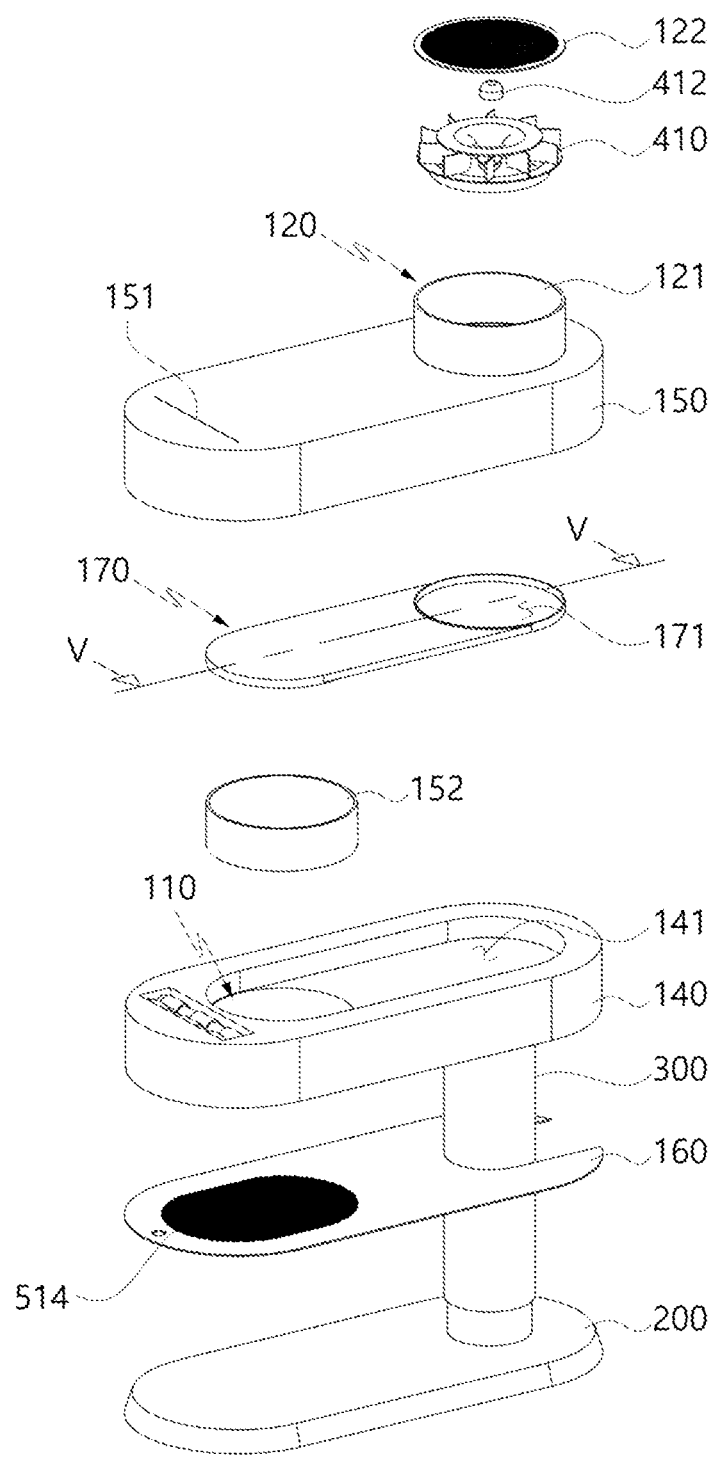
FIG. 4 is a partially exploded perspective view of the portable air flow apparatus according to an embodiment.

FIG. 4 is a partially exploded perspective view of the portable air flow apparatus according an embodiment. FIG. 4 illustrates a state in which one portion of the head 100 of the portable air flow apparatus 10 is exploded. With reference to FIG. 4, the head 100 according to this embodiment may include a head main body 130 and a flow path portion or flow path 170.

The head main body 130 according to this embodiment may be formed in such a manner that the suction inlet 110 and the discharge outlet 120, which are described above, are horizontally spaced apart from each other. The flow path 170 according to this embodiment may be provided inside of the head main body 130 and form a flow path along which the air suctioned through the head 110 flows toward the discharge outlet 120.

Figure 5:
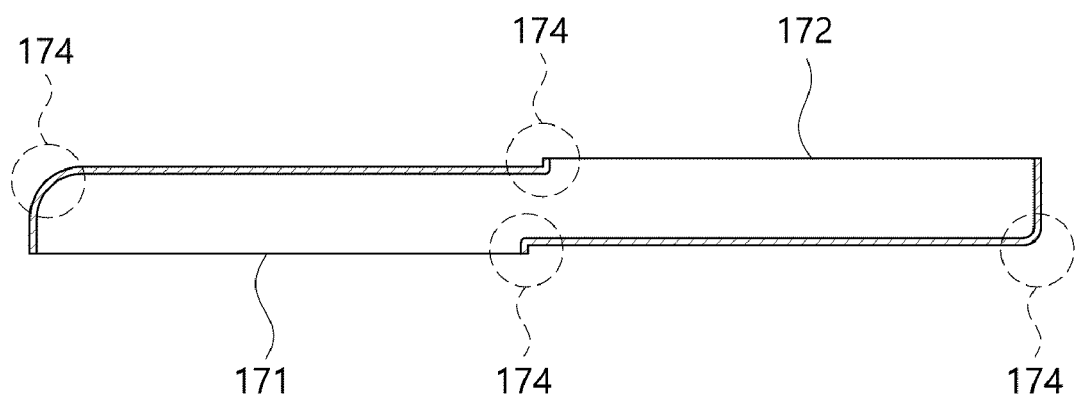
FIG. 5 is a cross-sectional view of a flow path, taken along line V-V in FIG. 4 according to an embodiment.

FIG. 5 is a cross-sectional view of a flow path, taken along line V-V in FIG. 4 according to an embodiment. With reference to FIGS. 3 and 5, for example, the flow path 170 according to this embodiment may include an inlet 171, an outlet 172, and an inner flow path 173.

The inlet 171 may be open at a bottom in a manner that faces toward the suction inlet 110 of the head main body 130. The outlet 172 may be open at a top in a manner that faces toward the discharge outlet 120 of the head main body 130. The inlet 171 and the outlet 172 horizontally communicate with each other through the inner flow path 173.

According to this embodiment, for example, as illustrated in FIGS. 4 and 5, a cylindrical member in which the inlet 171, the outlet 172, and the inner flow path 173 are formed may be mounted inside of the head main body 130 to form the flow path 170. As illustrated in FIG. 4, a flow path space 141 may be formed in the head main body 130. The flow path 170 may be seated in the flow path space 141.

In the embodiment illustrated in FIGS. 4 and 5, for example, the flow path 170 may be provided as a separate member, and may be mounted in the flow path space 141 inside of the head main body 130. However, the flow path 170 having the inlet 171, the outlet 172, and the inner flow path 173 may, of course, be formed by machining the inside of the head main body 130.

As illustrated in FIG. 5, an air flow direction may be changed in or at an edge portion or edge 174 of an inner wall surface of the inner flow path 173, and for this reason, the edge portion 174 may be machined in a rounded manner. Thus, flow loss, occurring due to collision of air flowing through the flow path 170 with the edge portion 174, may be minimized.

According to this embodiment, for example, the discharge outlet 120 may be formed in such a manner as to have a larger cross-sectional area than the flow path 170, in particular, the inner flow path 173. Usually, flow path loss occurs due to expansion or reduction of the flow path. When the flow path is expanded or reduced, in a case in which the discharge outlet 120 side cross-section area of the head 100 is larger than the flow path 170 side cross-sectional area of the head 100, flow path loss may be minimized.

According to this embodiment, for example, the discharge fan 410 and the fan motor 420 may be mounted in the head main body 130 in such a manner as to be positioned over and underneath, respectively, the outlet 172 in the flow path 170. More specifically, as illustrated in FIG. 3, the discharge fan 410 may be mounted in the head main body 130 in such a manner as to be positioned over the outlet 172 in the flow path 170. The fan motor 420 may be mounted in the head main body 130 in such a manner as to be positioned under the outlet 172 in the flow path 170.

With this configuration, the oil mist suctioned through the suction inlet 110 may flow along the flow path 170 and then be discharged through the discharge outlet 120 to the outside without passing through the fan motor 420 mounted under the flow path 170. Thus, the fan motor 420 may be prevented from being contaminated with oil mist. Accordingly, when the portable air flow apparatus 10 according to this embodiment is disassembled for cleaning, the fan motor 420 does not need to be disassembled and cleaned. Thus, the effect of simplifying the job of disassembly and cleaning the portable air flow apparatus 10 may be achieved.

The head main body 130, as illustrated in FIG. 3, may include casing main body 140, an upper casing 150, and a lower casing 160. The suction inlet 110 may be formed in the casing main body 140 according to this embodiment. For example, the separate flow path 170 is described above as being mounted. Accordingly, as illustrated in FIG. 3, the flow path space 141 in which the flow path 170 is seated may be formed in the casing main body 140.

The discharge outlet 120 may be formed in the upper casing 150 according to this embodiment. The flow path space 141 formed in the casing main body 140 may be open at a top. The upper casing 150 may be coupled with the casing main body 140, in a direction of moving down from over the casing main body 140, and thus, close the flow path space 141. Accordingly, a user may separate the upper casing 150 from the casing main body 140 and then may separate the flow path 170 seated in the flow path space 141. Thus, it is possible to clean the separated flow path 170.

According to this embodiment, for example, the upper casing 150 may be coupled with the casing main body 140 in such a manner as to surround a lateral surface of the casing main body 140. That is, the upper casing 150 may form an outside lateral surface of the head main body 130.

The lower casing 160 according to this embodiment may be coupled with the casing main body 140, in a direction of moving up from under the casing main body 140. For example, the lower casing 160 according to this embodiment may have a shape of a plate.

A through-hole (not illustrated) may be formed, at a position corresponding to the suction inlet 110, in the lower casing 160 that passes therethrough from a top to a bottom. A free filter 514 may be mounted in the through-hole formed in the lower casing 160. According to this embodiment, the free filter 514 may filter out relatively large-sized dust or foreign material, for example, to prevent introduction thereof into the suction inlet 110 side of the head 100.

The discharge outlet 120 according to this embodiment, as illustrated in FIGS. 3 and 4, may further include a fan housing 121. The fan housing 121 may protrude upward from an upper plate-like surface of the head main body 130. According to this embodiment, the upper casing 150 may form the upper plate-like surface of the head main body 130. Accordingly, for example, the fan housing 121 may be formed in an upper plate-like surface of the upper casing 150 such that it protrudes upward therefrom.

In this case, according to this embodiment, for example, the fan housing 121 may have a shape of a cylinder which is open at a top and bottom, and the discharge fan 410 may be accommodated inside of the fan housing 121. More specifically, the fan housing 121 may be formed in the upper casing 150 of the head main body 130 such that it protrudes upward therefrom and be configured to accommodate the discharge fan 410 therein. Thus, as illustrated in FIG. 3, although the discharge fan 410 and the fan motor 420 are arranged, in the vertical direction, in the head main body 130, the head main body 130 may be slimly formed so that an entire thickness thereof is small.

A discharge grill 122 may be detachably coupled with an upper end of the fan housing 121 according to this embodiment, and thus, may cover an upper opening in the fan housing 121. Accordingly, when the discharge fan 410 rotates, an accident, such as collision with the discharge fan 410, may be prevented, and it is possible to discharge the oil mist over the discharge fan 410.

Figure 6:
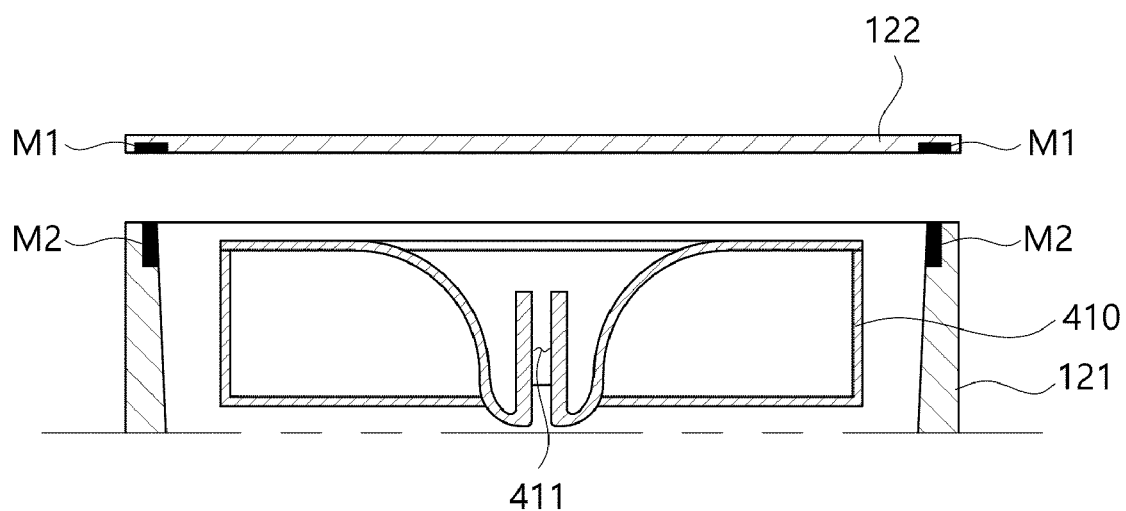
FIG. 6 is a cross-sectional view illustrating a discharge outlet according to an embodiment.

For example, the discharge fan 410 may be detachably coupled with the fan housing 121 using a magnetic force. With reference to FIG. 6, at least one first magnetic member M may be mounted on or at an edge portion or edge of the discharge grill 122, and a second magnetic member corresponding to the first magnetic member M may be mounted on or at an upper edge portion or edge of the fan housing 121. Thus, the discharge grill 122 may be detachably coupled with the upper end of the fan housing 121. Both the first magnetic member M and the second magnetic member M may have a magnetic force. Of course, only one thereof may have a magnetic force.

Alternatively, the discharge grill 122 may be coupled with the fan housing 121 in such a manner that it is forced into the fan housing 121. Of course, the discharge grill 122 may be detachably coupled with the fan housing 121 in various ways, such as hooking the discharge grill 122 and the fan housing 121 by rotating the discharge grill 122.

Figure 7:
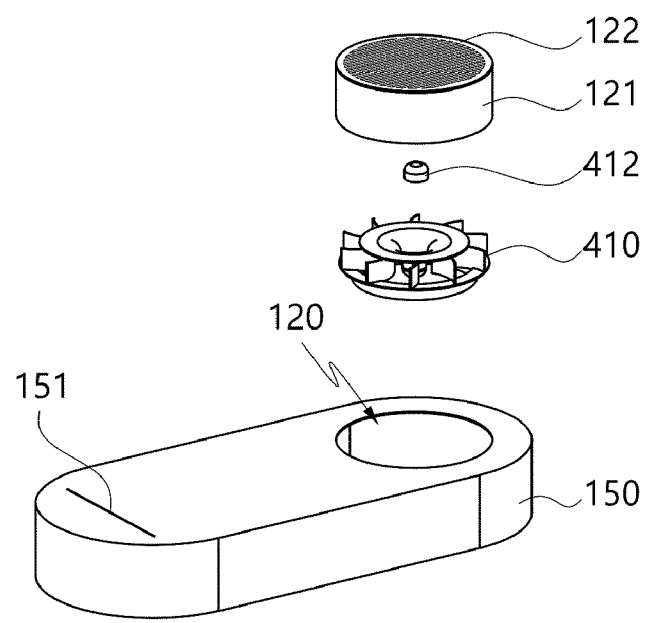
FIG. 7 is a partially exploded perspective view illustrating a discharge outlet according to another embodiment.

In the embodiment illustrated in FIG. 4, for example, a structure where the fan housing 121 is integrally formed with the upper casing 150 of the head main body 130 or is not separated from the upper casing 150 of the head main body 130 is employed. As another example, as illustrated in FIG. 7, the fan housing 121 may be detachably coupled with the upper casing 150 of the head main body 130.

Figure 8:
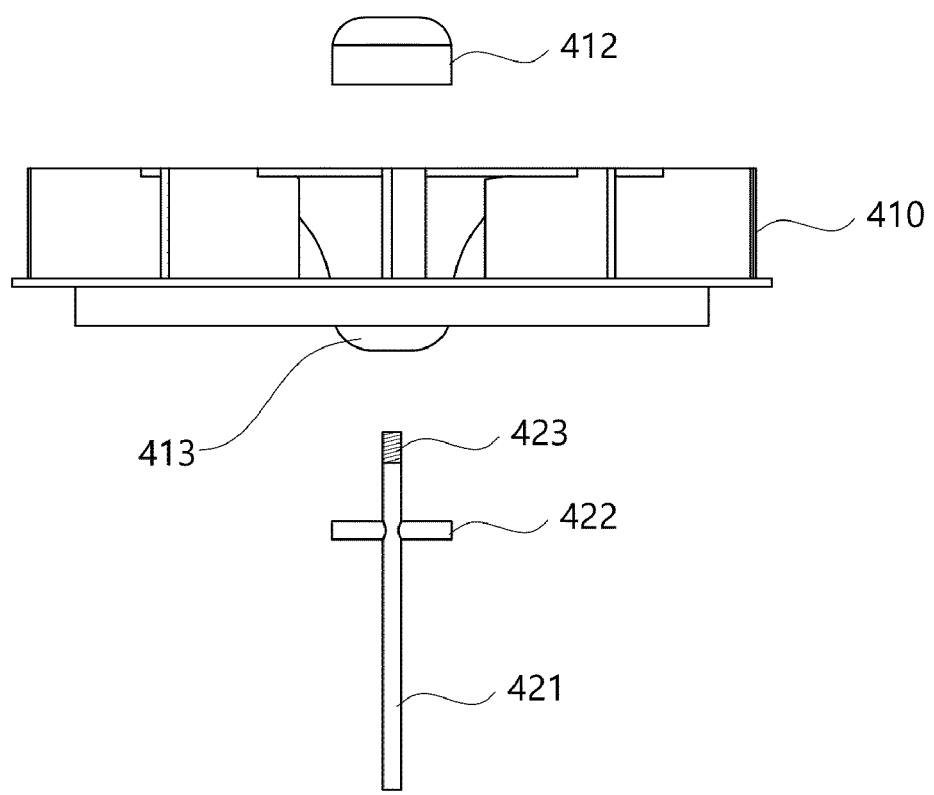
FIGS. 8 and 9 are views illustrating a coupling structure between a discharge fan and a fan motor according to an embodiment.
Figure 9:
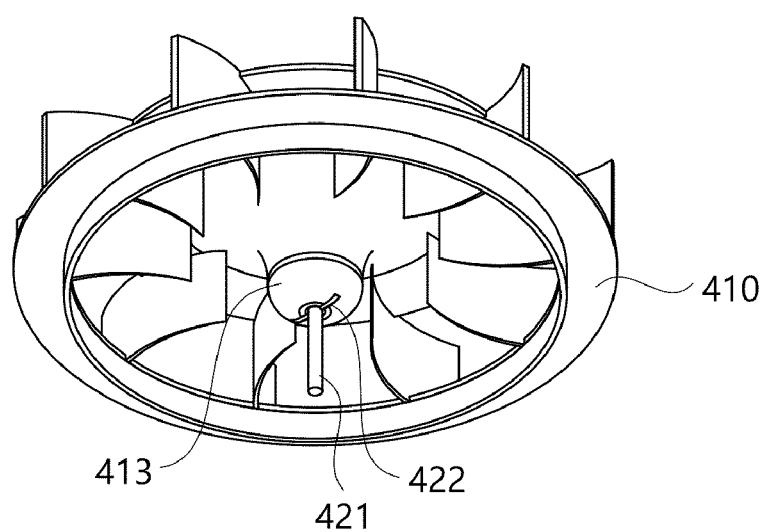

FIGS. 8 and 9 are views illustrating a coupling structure between a discharge fan and a fan motor according to an embodiment. With reference to FIGS. 3, 8, and 9, the fan motor 420 according to this embodiment may include a fan shaft 421. The fan shaft 421 may extend from the fan motor 420 toward the discharge fan 410 and transfer a rotational force of the fan motor 420 to the discharge fan 410. A screw thread 423, as illustrated in FIG. 8, may be formed on an outer surface of an end portion or end of the discharge fan 410.

A shaft through-hole 411 (refer to FIG. 6) may be formed in the discharge fan 410 according to this embodiment in such a manner that it passes therethrough from top to bottom. When the discharge fan 410 is connected to the fan motor 420, an end portion or end of the fan shaft 421 may pass through the shaft through-hole 411, and thus, the discharge fan 410 may be coupled with the fan shaft 421. In this case, the end portion of the fan shaft 421 on which the screw thread 423 is formed may be exposed to the outside in such manner that is positioned over the discharge fan 410.

The discharge fan 410 according to this embodiment may further include a fan nut 412. The end portion or end of the fan shaft 421 that has the screw thread 423 thereon may pass through the shaft through-hole 411 and then be inserted into the fan nut 412. Thus, the discharge fan 410 may be fixed to the fan shaft 421.

With the above-described configuration, after the discharge grill 122 is separated or the fan housing 121 is separated, the fan nut 412 may be loosened from the fan shaft 421. Thus, the discharge fan 410 may be separated from the fan shaft 421.

According to this embodiment, for example, a fan blocking portion 413 may be formed in or at a bottom of the discharge fan 410. The fan shaft 421 may further include a shaft blocking protrusion 422 that sticks in the fan blocking protrusion 413. The shaft blocking protrusion 422 according to this embodiment may radially protrude outward from an outer circumferential surface of the fan shaft 421. Thus, when passing through the shaft through-hole 411, the fan shaft 421 may stick in the fan blocking portion 413. As illustrated in FIGS. 8 and 9, according to this embodiment, for example, the shaft blocking protrusion 422 may be formed in the shape of a bar on the outer circumferential surface of the fan shaft 421 such that it radially protrudes outward therefrom. The fan blocking portion 413 may be formed in the shape of a groove such that the shaft blocking protrusion 422 in the shape of a bar is inserted into the fan blocking portion 413. Accordingly, when rotation of the fan motor 420 rotates the fan shaft 421, the shaft blocking protrusion 422, movement of which is blocked by the fan blocking portion 413, rotates the discharge fan 410.

The portable air flow apparatus 10 according to this embodiment, as illustrated in FIG. 3, may further include a filter unit 500. The filter unit 500 according to this embodiment may be mounted in the suction inlet 110. The filter unit 500 may include at least one purification filter 512, 513, or 514 that purifies air suctioned through the suction inlet 110. For example, the purification filter 512, 513, or 514 may include at least one of a deodorizing filter 512 or an oil mist filter 513. The deodorizing filter 512 and the oil mist filter 513 may be mounted. The purification filter 512, 513, and 514 may further include the free filter 514 mounted in the through-hole in the lower casing 160.

A fiber filter, such as a non-woven fabric filter, may be used as the oil mist filter 513. An aluminum mesh filter may be used as the free filter 514, and a filter formed of a corrugated activated carbon material may be used as the deodorizing filter 512. The deodorizing filter 512, the oil mist filter 513, and the free filter 514 described above are exemplary, and therefore, filters formed of other materials may be used.

According to this embodiment, for example, as illustrated in FIG. 4, the upper casing 150 may be separated from the casing main body 140, and the deodorizing filter 512 may be mounted in the suction inlet 110, in a direction of moving downward from over the suction inlet 110 of the casing main body 140. Accordingly, the upper casing 150 may be separated from the casing main body 140. Then, it is possible to replace the deodorizing filter 512.

For example, the oil mist filter 513 according to this embodiment may be formed in the shape of a roll filter. The portable air flow apparatus 10 according to this embodiment may include a roll filter unit 600 capable of discharging the oil mist filter 513 to outside of the head 100 by way of the suction inlet 110 side of the head 100.

FIGS. 10 to 16 are views illustrating a roll filter unit according to an embodiment. With reference to FIGS. 10 to 16, the roll filter unit 600 according to this embodiment may include a filter roll 610 and a filter transportation unit 620.

Figure 10:
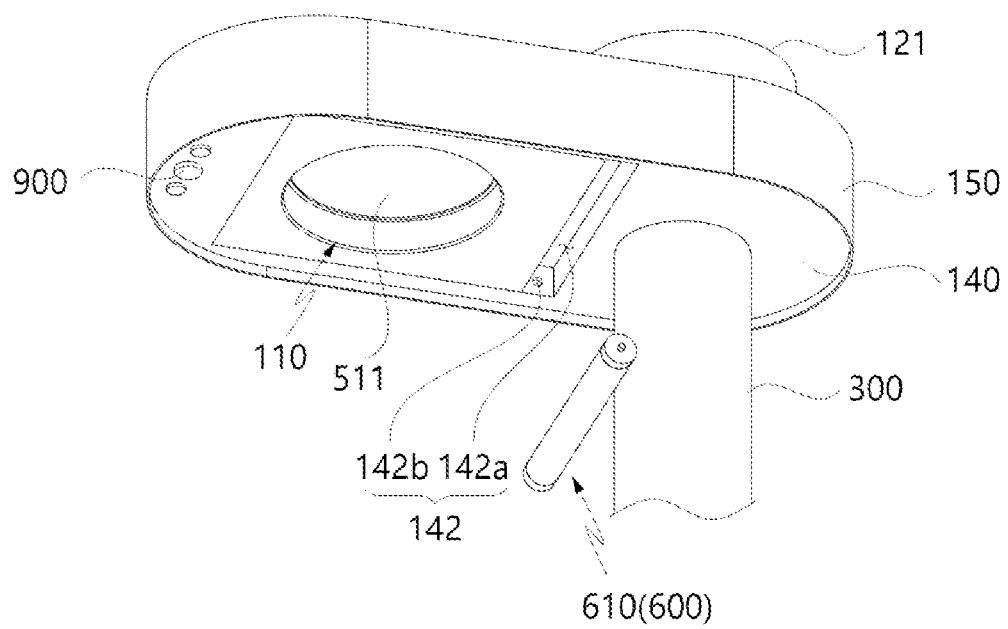

The oil mist filter 513 may be wound on the filter roll 610. In this case, the filter roll 610, on which the oil mist filter 513 is wound, may be rotatably mounted on the head 100. For example, as illustrated in FIG. 10, the roll filter 610 may be detachably mounted on a roll mounting portion 142 formed in a lower portion of the casing main body 140 of the head main body 130.

The roll mounting portion 142 according to this embodiment may include a roll accommodation portion 142a and a shaft coupling portion 142b. The roll accommodation portion 142a may be formed in a lower surface of the casing main body 140 such that it is recessed therefrom, and the filter roll 610 may be inserted into the roll accommodation portion 142a from below. The shaft coupling portion 142b may be formed on each of opposite inner lateral surfaces of the roll accommodation portion 142a, and may be coupled with a roll combination kit 612 described hereinafter of the filter roll 610.

Figure 11:
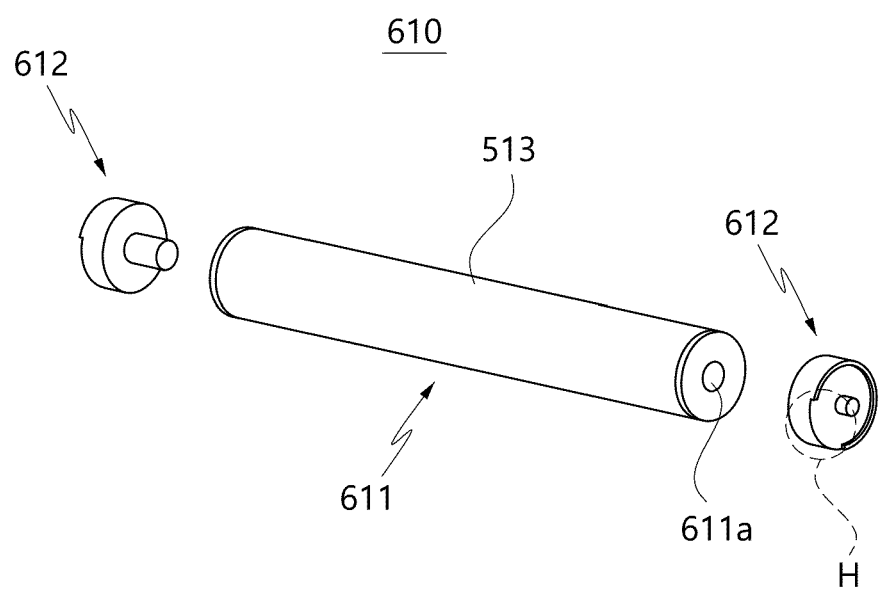
Figure 12A:
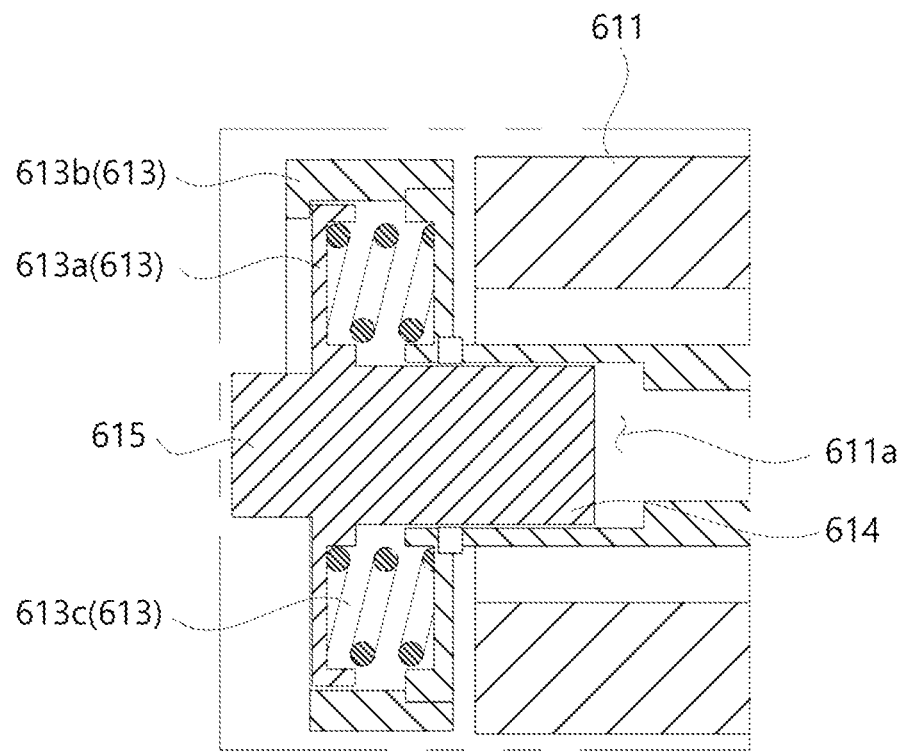
Figure 12B:
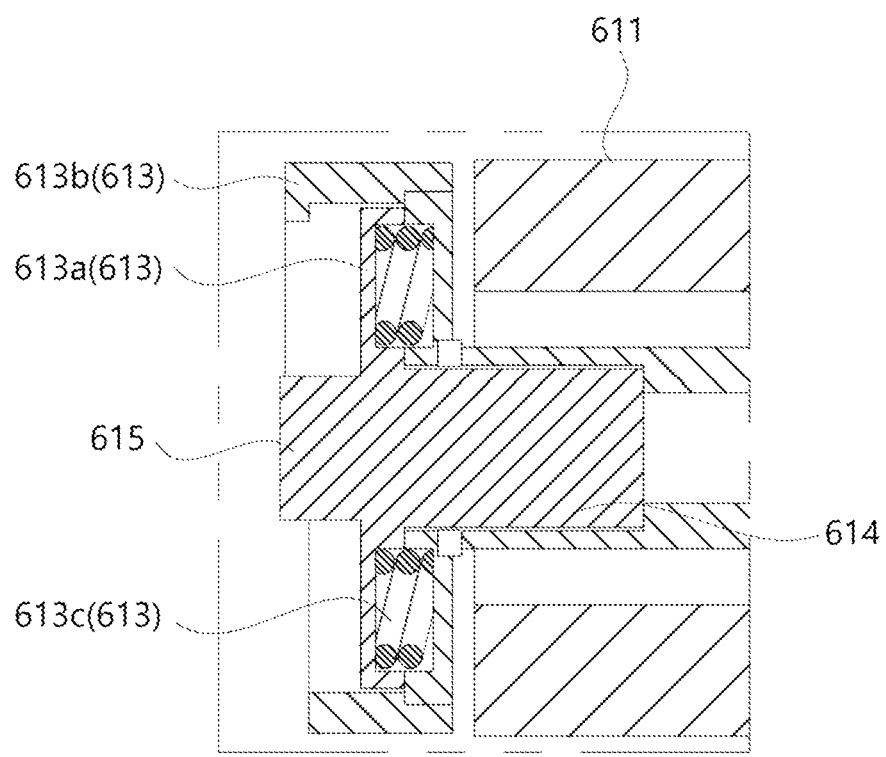

The filter roll 610 according to this embodiment, as illustrated in FIGS. 11, 12A, and 12B, may include a filter drum 611 and a pair of the roll combination kits 612. The filter drum 611 may be formed in the shape of a cylinder, and the oil mist filter 513 may be wound on an outer circumferential surface thereof.

The roll combination kits 612 forming a pair may be mounted on opposite sides, respectively, of the filter drum 611. In this case, the roll combination kits 612 may rotatably support the filter drum 611. When the filter roll 610 is mounted on the roll mounting portion 142, the roll combination kits 612 may be detachably coupled with shaft coupling portions 142b, respectively.

According to this embodiment, for example, the roll combination kit 612, as illustrated in FIGS. 12A and 12B, may include a kit main body 613, a first shaft protrusion 614, and a second shaft protrusion 615. The first shaft protrusion 614 may protrude from a first side surface of the kit main body 613 and may be rotatably coupled with a lateral surface of the filter drum 611. A protrusion insertion groove 611a into which the first shaft protrusion 614 may be rotatably inserted may be formed in a lateral surface of the filter drum 611.

The second shaft protrusion 615 according to this embodiment may protrude from a second side surface of the kit main body 613 and may be inserted into the shaft coupling portion 142b of the roll mounting portion 142. When coupled with the shaft coupling portion 142b, the second shaft protrusion 615 may be pressed in a direction in which the second shaft protrusion 615 is inserted into the shaft coupling portion 142b.

For example, the kit main body 613 according to this embodiment, as illustrated in FIGS. 12A and 12B, may include a first kit member 613a, a second kit member 613b, and a pressing member or spring 613c. The second shaft protrusion 615 may be formed on the first kit member 613a. The second shaft protrusion 615 may be coupled with the first kit member 613a such that it is movable in a rotational direction of the filter drum 611. For example, the first shaft protrusion 614 and the second shaft protrusion 615 may be formed on opposite side plate-like surfaces, respectively, of the second kit member 613b in such a manner as to be integrally coupled with each other.

The pressing member 613c according to this embodiment may be mounted between the first kit member 613a and the second kit member 613b. The pressing member 613c may press the second kit member 613b in a direction in which the second shaft protrusion 615 is inserted into the shaft coupling portion 142b. For example, the pressing member 613c may be a compression spring.

With the above-described configuration, when mounting the filter roll 610 on the roll mounting portion 142, in a state in which the filter roll 610 is inserted into the roll accommodation portion 142a, the user may insert the second shaft protrusion 615 into the shaft coupling portion 142b by pressing the second kit member 613b on a second side in the direction of the first kit member 613a, with the second shaft protrusion 615 on a first side being inserted into the shaft coupling portion 142b. In this case, with an elastic force of the pressing member 613c, the combination of the second shaft protrusion 615 and the shaft coupling portion 142b, and the combination of the first shaft protrusion 614 and the protrusion insertion groove 611a may be maintained with a predetermined force. Accordingly, when the filter transportation unit 620 transports the oil mist filter 513 wound on the filter roll 610, the oil mist filter 513 may be held under tension. Thus, the oil mist filter 513 may be prevented from being easily unwound.

A cut portion H may be formed in an edge portion or edge in the shaft coupling portion 142b direction of the first kit member 613a by cutting off a portion of the edge portion. Thus, a space into which a user's finger, for example, may be inserted may be provided for the user to push the second kit member 613b.

The filter transportation unit 620, as illustrated in FIG. 3, may be mounted in the head 100 in such a manner as to be positioned in a direction opposite to a direction of the filter roll 610 with the suction inlet 110 therebetween. According to this embodiment, for example, the filter roll 610 may be mounted inside of the casing main body 140 of the head main body 130.

According to this embodiment, the filter roll 610 and the filter transportation unit 620 may be mounted in opposite directions, respectively, in which the suction inlet 110 and the discharge outlet 120 are spaced apart, with the suction inlet 110 therebetween. For example, the filter roll 610 may be mounted on the discharge outlet 120 side, with the suction inlet 110 therebetween, in such a manner as to be positioned in a direction opposite to a direction of the filter transportation unit 620.

The filter transportation unit 620 according to this embodiment may discharge the oil mist filter 513 that extends from the filter roll 610 and passes the suction inlet 110, to the outside of the head 100. For example, the filter transportation unit 620 may discharge the oil mist filter 513 to over the head 100.

Figure 13:
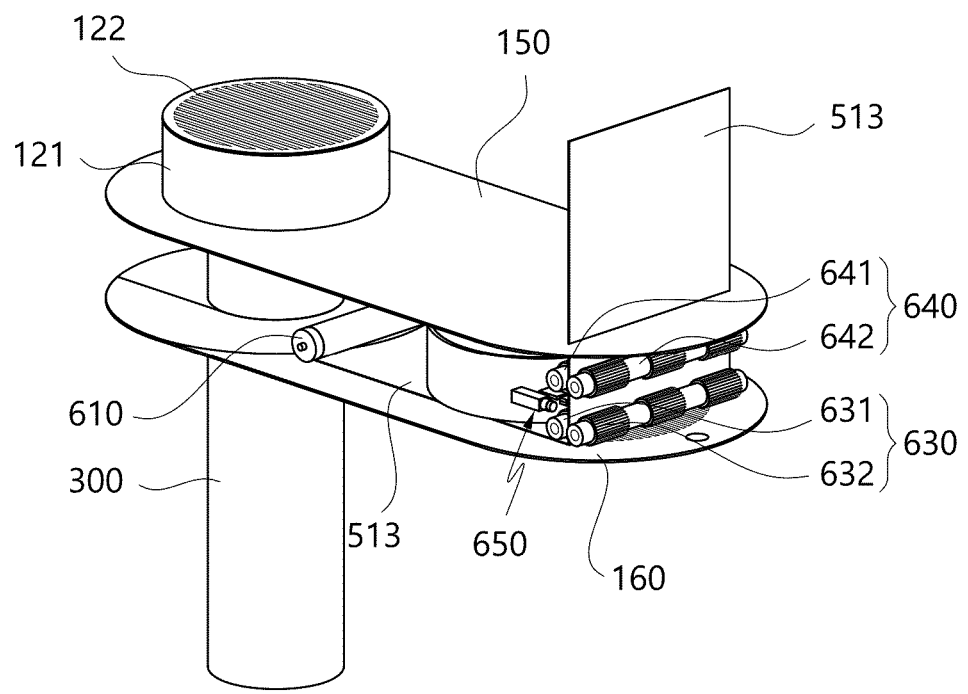
Figure 14:
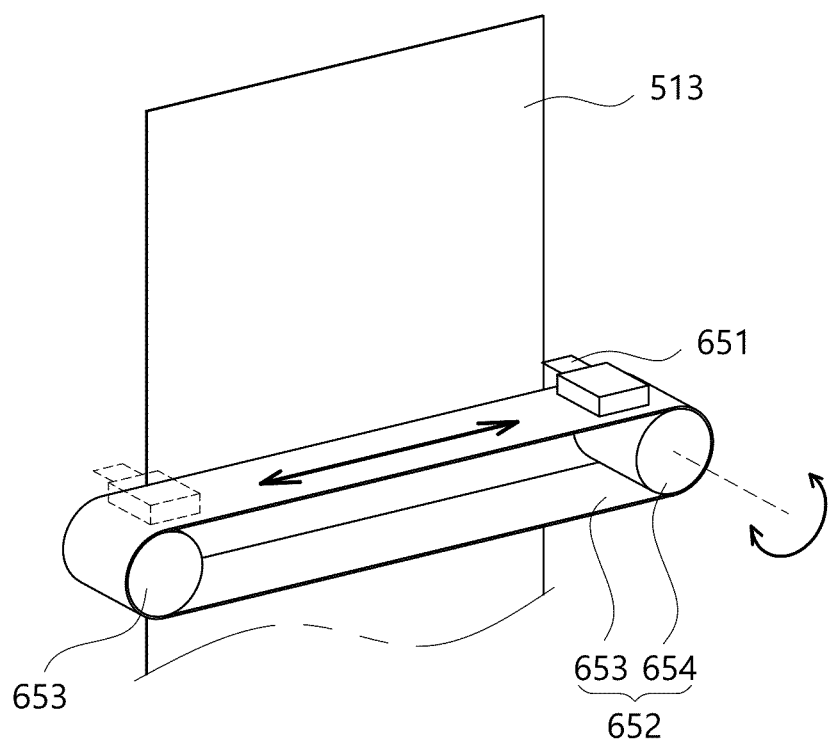

With reference to FIGS. 3, 13, and 14, more particularly, the filter transportation unit 620 according to this embodiment may include a first roller unit 630 and a second roller unit 640. The first roller unit 630 and the second roller unit 640 may be mounted inside of the casing main body 140 vertically spaced apart, and thus, may discharge the oil mist filter 513 to over the head 100.

For example, the first roller unit 630 and the second roller unit 640 according to this embodiment may each include first transportation roller 631 or 641 and second transportation roller 632 or 642. The first transportation roller 631 or 641 and the second transportation roller 632 or 642 may be horizontally rotated in such a manner as to face each other with the oil mist filter 513 therebetween, and thus, may transport the oil mist filter 513 upward.

According to this embodiment, for example, a concave-convex portion in the shape of gear teeth may be formed on outer circumferential surfaces of the first transportation roller 631 or 641 and the second transportation roller 632 or 642, and thus, transportation of the oil mist filter 513 may be facilitated.

According to this embodiment, for example, the filter transportation unit 620 may further include a cutting unit 650. For example, the cutting unit 650 may cut the purification filter 512, 513, or 514 in a traverse direction between the first roller unit 630 and the second roller unit 640.

Accordingly, after the portable air flow apparatus 10 according to this embodiment is used for a predetermined period of time, when the filter transportation unit 620 transports the oil mist filter 513, a new portion of the oil mist filter 513 wound on the filter roll 610 may be moved toward the suction inlet 110, and at the same time, a previously used portion thereof may be moved along the filter transportation unit 620 toward the outside of the head 100. When the cutting unit 650 cuts the oil mist filter 513 in the traverse direction between the first roller unit 630 and the second roller unit 640, the user may remove the cut-off portion by pulling an exposed portion of the oil mist filter 513 to over the head 100. Thereafter, when the filter transportation unit 620 further transports the oil mist filter 513, as illustrated in FIG. 1, an end portion of the oil mist filter 513 may be kept exposed to the outside in such a manner that it is positioned over the head 100. In this case, when using the oil mist filter 513, as illustrated in FIG. 1, for example, the end portion of the oil mist filter 513 may be kept exposed to the outside in such a manner that it is positioned over the head 100. Of course, control may be performed in such a manner that, only when cutting the oil mist filter 513, the end portion thereof is exposed to the outside.

FIG. 14 is a view of a cutting unit according to an embodiment. Cutting unit 650 according to this embodiment may include a cutter 651 that cuts the oil mist filter 513. In addition, the cutting unit 650 according to this embodiment may include cutter moving unit 652 that reciprocates the cutter 651 in the traverse direction and enables the cutter 651 to cut the oil mist filter 513 in the traverse direction.

For example, the cutter moving unit 652 may include a belt 653 and a pair of pulleys 654. In a state in which the cutter 651 is mounted on the belt 653, when one of the pair of pulleys 654 rotates forward or backward, the cutter 651 mounted on the belt 654 may cut the oil mist filter 513 in the traverse direction while reciprocating along the belt 654.

For example, the filter roll 610 according to this embodiment, as illustrated in FIG. 10, may be mounted on the roll mounting portion 142 in such a manner as to be unwound in a direction of surrounding a lower portion of the head main body 130 in the lower portion of the head main body 130 and then to extend to under, through, or along the suction inlet 110. For example, the oil mist filter 513 may pass under, through, or along the suction inlet 110 and then be transmitted by the filter transportation unit 620 toward the filter transportation unit 620 in a state of being inclined upward. With this configuration, the filter roll 610 unwound from the oil mist filter 513 may be transported in a state of being inclined only in one direction. Thus, it is possible for the filter transportation unit 620 to smoothly transport the oil mist filter 513.

In addition, a filter discharge hole 151 may be formed in the upper casing 150 according to this embodiment in such a manner that it passes therethrough from top to bottom. Accordingly, the end portion of the oil mist filter 513 transported by the filter transportation unit 620 may pass through the filter discharge hole 151 formed in the upper casing 150 and be transported to over the head 100. Thus, it is possible to discharge the end portion thereof to the outside of the head 100.

Figure 15:
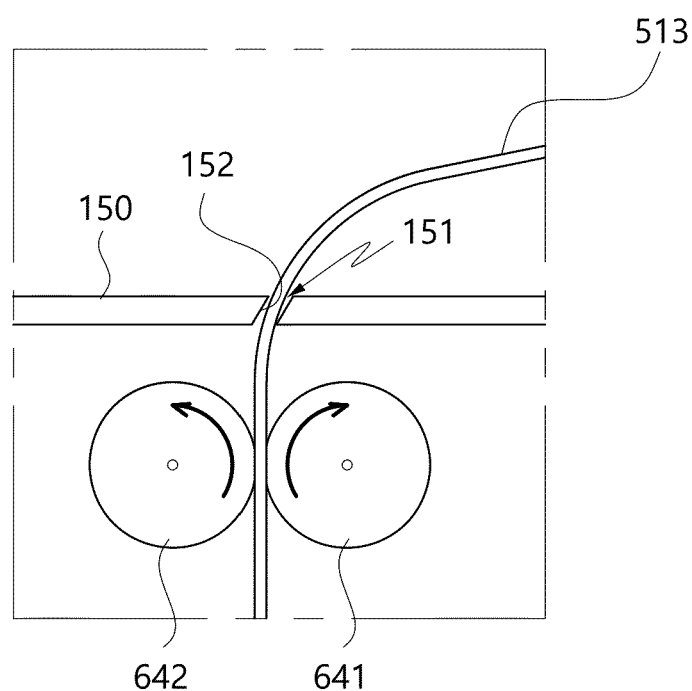

In this case, the filter discharge hole 151 according to this embodiment, as illustrated in FIG. 15, may include an inclined surface 152. The inclined surface 152 may be formed on an inner lateral surface of the filter discharge hole 151 in such a manner that it is inclined in the direction of the discharge outlet 120 in order for the oil mist filter 513 to be discharged through the filter discharge hole 151 in the direction of the discharge outlet 120.

With this configuration, the oil mist filter 513 unwound from the filter roll 610 may be transported in a state of being inclined only in one direction. Thus, it is possible to smoothly transport the oil mist filter 513. In addition, the cut-off portion of the oil mist filter 513 may be discharged to over the head 100 toward the discharge outlet 120 which is in an opposite direction to the cooktop. Thus, a fire accident due to discharging of the cut-off portion in the direction of the cooktop may be prevented.

The casing main body 140 according to this embodiment, as illustrated in FIG. 16, may include a first casing main body 140a and a second casing main body 140b, for example. The first casing main body 140a may form most of the casing main body 140. For example, the suction inlet 110 and the roll mounting portion 142 may be formed in the first casing main body 140a. In addition, the flow path space 141 in which the flow path 170 is seated may be formed in the first casing main body 140a. The first casing main body 140a may be coupled with the column 300.

The second casing main body 140b according to this embodiment may be coupled with the first casing main body 140a by a hinge mechanism having a vertical axis, for example. Accordingly, the second casing main body 140b, as illustrated in FIG. 16, may horizontally open and close the first casing main body 140a.

When the second casing main body 140b opens the first casing main body 140a, the filter transportation unit 620 mounted inside of the casing main body 140, as illustrated in FIG. 16, may be exposed to the outside. Accordingly, after the second casing main body 140b is opened, the first roller unit 630 and the second roller unit 640 may be separated from each other. Thus, it is possible to clean the first roller unit 630 and the second roller unit 640 which have been used for a predetermined period of time.

According to this embodiment, for example, the first transportation roller 631 or 641 of each of the first roller unit 630 and the second roller unit 640 may be mounted in the first casing main body 140*a*. The second transportation roller 632 or 642 of each of the first roller unit 630 and the second roller unit 640 may be mounted in the second casing main body 140*b*. Accordingly, when the second casing main body 140*b* closes the first casing main body 140*a*, the oil mist filter 513 may be interposed between the first transportation roller 631 or 641 and the second transportation roller 632 or 642. Thus, a process of replacing the filter roll 610 may be facilitated.

FIGS. 17A to 17D and 18A to 18C are views illustrating a process of mounting a new filter roll in a portable air flow apparatus according to an embodiment. Only reference characters necessary to identify components which are described are shown in FIGS. 17A to 17D and 18A to 18C.

Figure 17A:
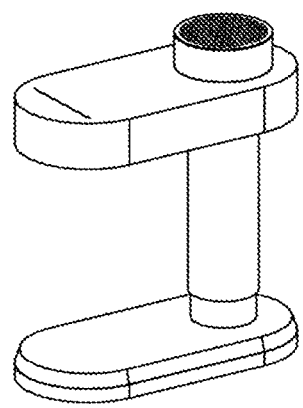
FIGS. 17A to 17D and 18A to 18C are views illustrating a process of mounting a new filter roll in the portable air flow apparatus according to an embodiment.
Figure 17B:
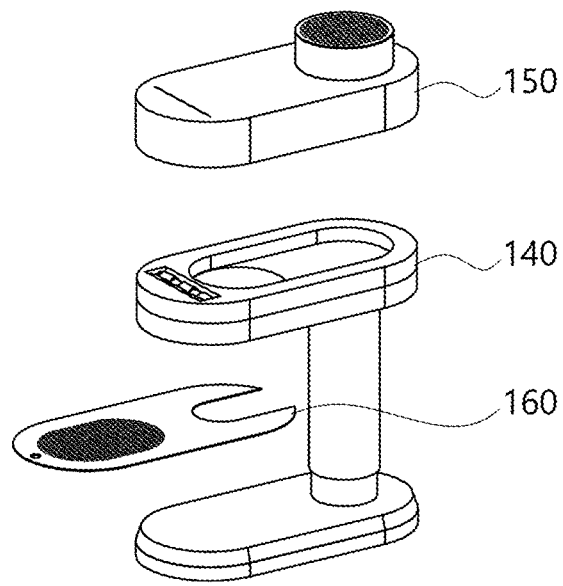

The process of mounting a new filter roll 610 is described with reference to FIGS. 17A to 17D and 18A to 18C. First, in a state in which the portable air flow apparatus 10 according to this embodiment is assembled, as illustrated in FIG. 17A, the upper casing 150 and the lower casing 160 are separated from the casing main body 140, as illustrated in FIG. 17B.

Figure 17C:
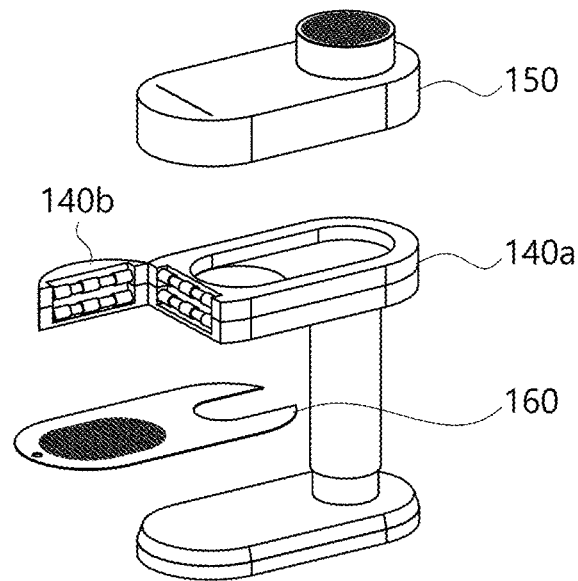

Thereafter, as illustrated in FIG. 17C, the second casing main body 140*b* is rotated with respect to the first casing main body 140*a*, and thus, the first casing main body 140*a* is opened in a forward direction. In this case, as described above, the first transportation roller 631 or 641 is mounted in the first casing main body 140*a*, and the second transportation roller 632 or 642 is mounted in the first casing main body 140*a*.

Figure 17D:
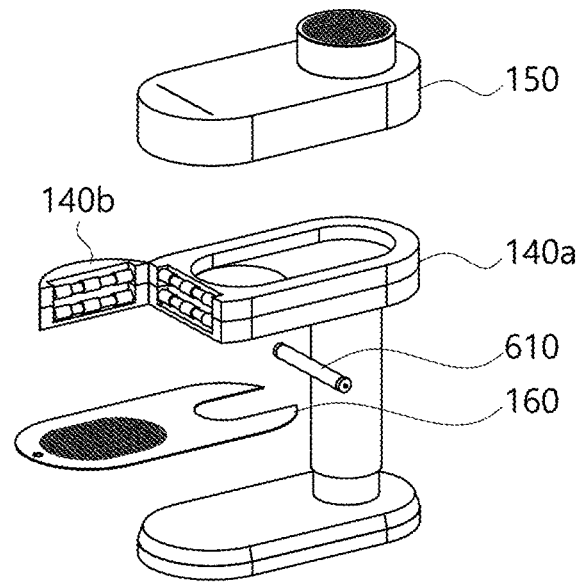
Figure 18A:
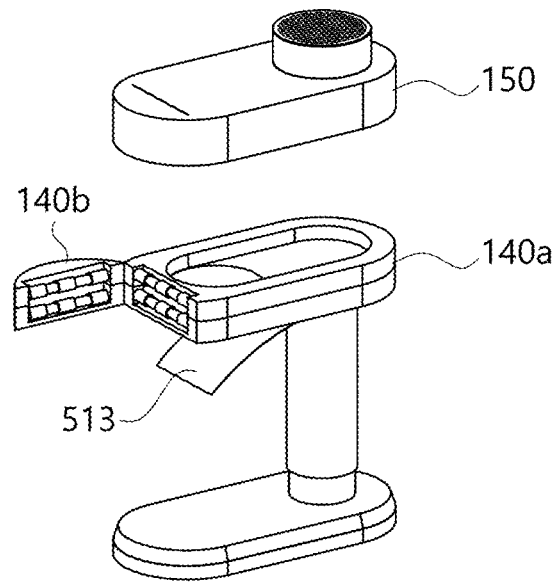
Figure 18B:
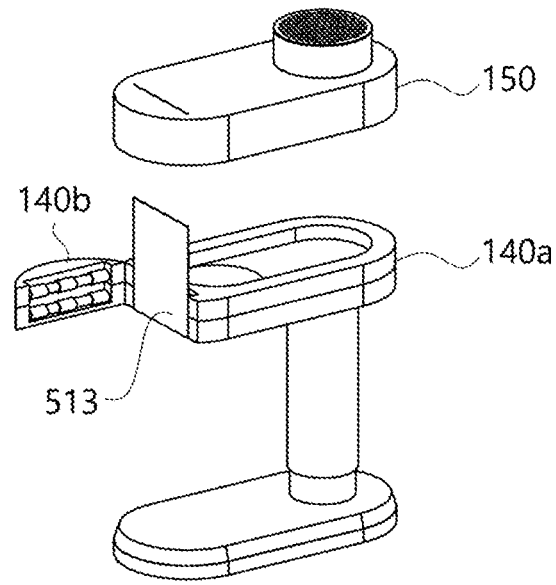

Thereafter, as illustrated in FIG. 17D, the filter roll 610 is mounted in the roll mounting portion 142 provided on a lower surface of the first casing main body 140*a* according to the above-described method. Thereafter, as illustrated in FIG. 18A, the end portion of the oil mist filter 513 is pulled from the filter roll 610 mounted on the roll mounting portion 142, and thus, is unwound and extends at a predetermined angle from a front end portion of the first casing main body 140*a*. As illustrated in FIG. 18B, the oil mist filter 513 is directed upward. In this case, one side plate-surface of the oil mist filter 513 is brought into close contact with a front surface of the first transportation roller 631 or 641 mounted in the first casing main body 140*a*.

Figure 18C:
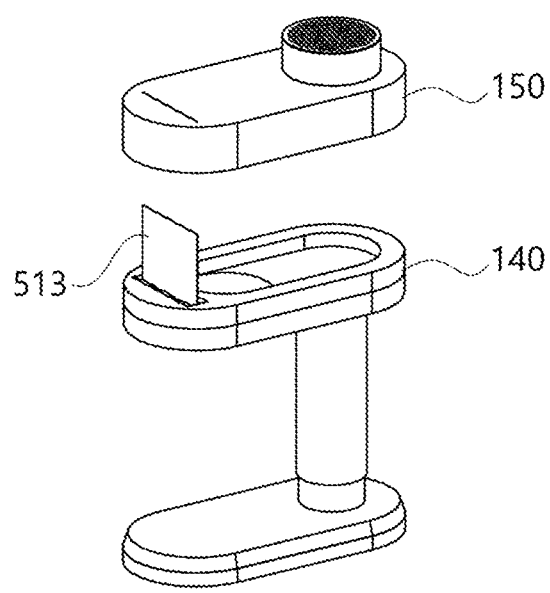

Thereafter, the second casing main body 140*b* is rotated, and thus, a front of the first casing main body 140*a* is covered, as illustrated in FIG. 18C. Then, the oil mist filter 513 is positioned between the first transportation roller 631 or 641 and the second transportation roller 632 or 642, and the oil mist filter 513 is fixed in a state in which the end portion thereof is exposed to the outside in such a manner that it extends upward from the casing main body 140.

Then, the upper casing 150 and the lower casing 160 are coupled with the casing main body 140, as illustrated in FIG. 1, the oil mist filter 513 is completely mounted in a state in which the end portion thereof is exposed to the outside such that it extends upward from the head 100. In this case, it is desirable that the upper casing 150 is coupled with the casing main body 140 after the end portion of the oil mist filter 513 passes through the filter discharge hole 151.

Alternatively, when the lower casing 160 is coupled with the casing main body 140, in a state as illustrated in FIG. 18B, the lower casing 160 may be first fixed to the first casing main body 140*a*, and then the second casing main body 140*b* may be rotated.

Figure 19:
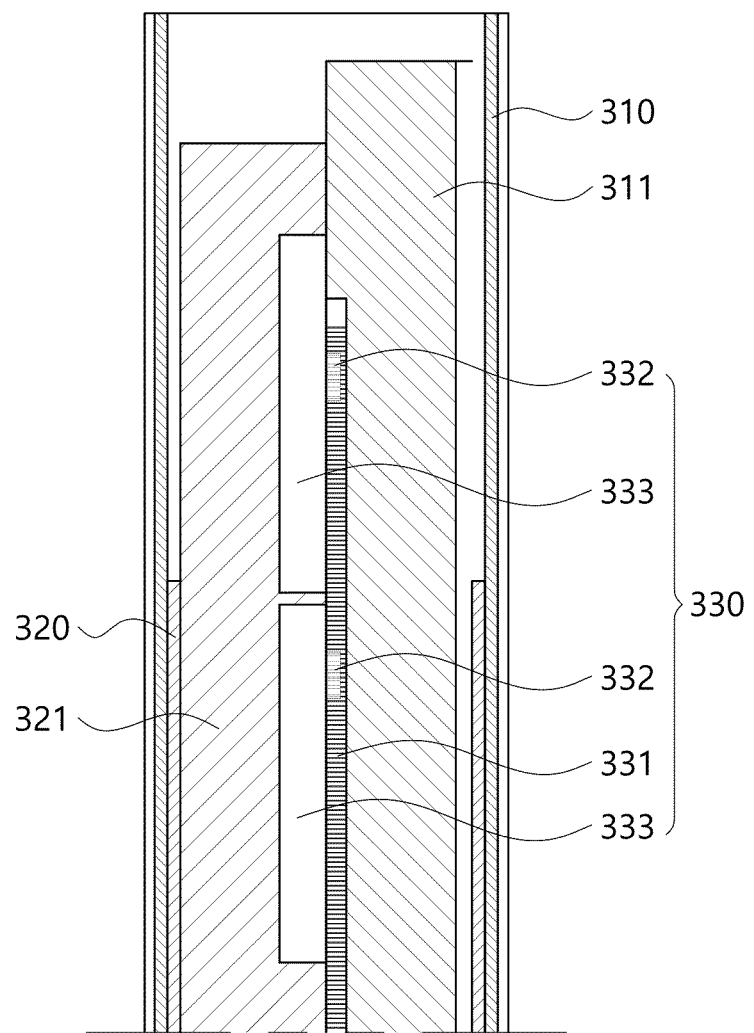
FIGS. 19, 20A, and 20B are views illustrating a height adjustment structure of a column according to an embodiment.
Figure 20A:
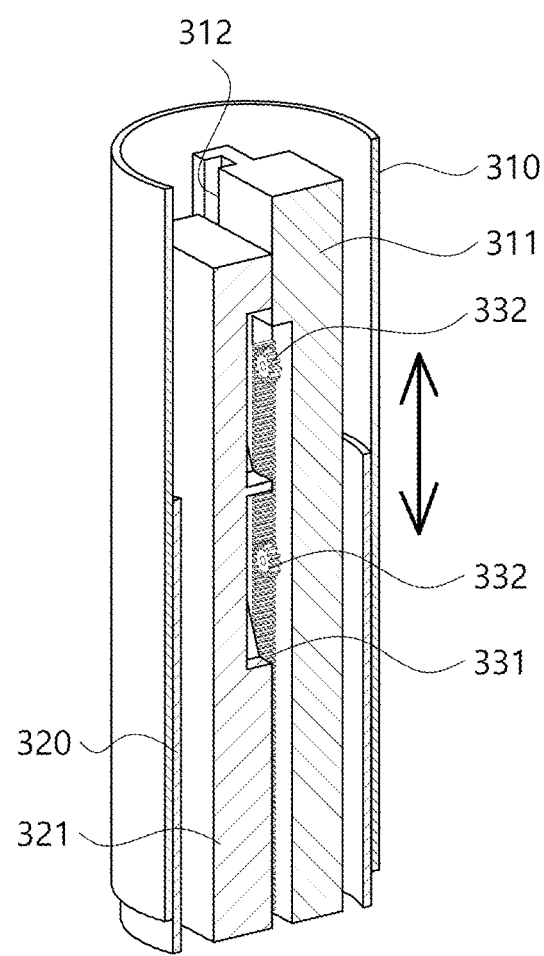
Figure 20B:
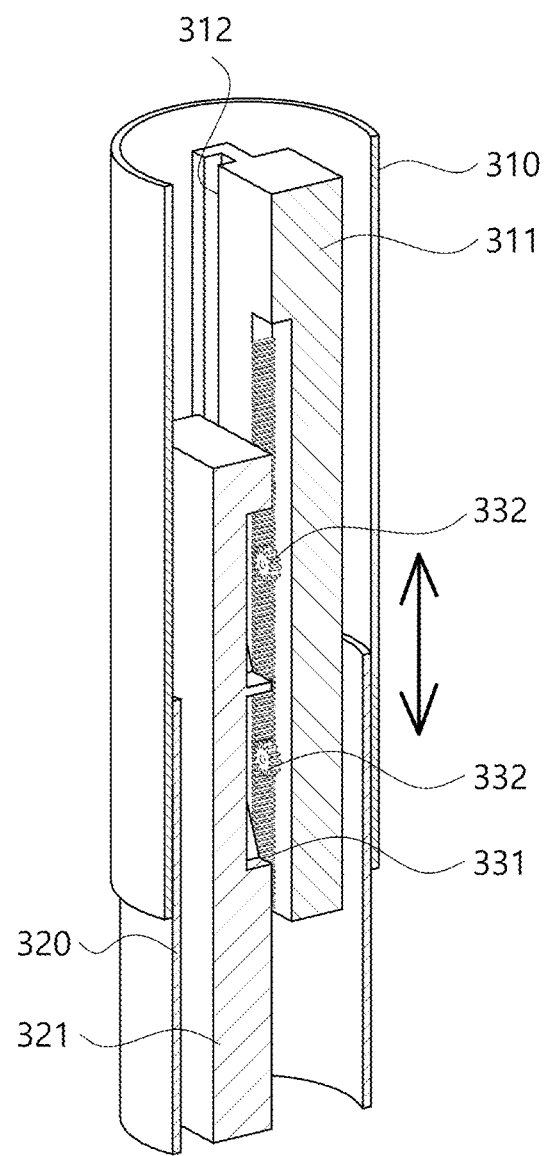

The column 300 according to this embodiment may be provided such that a distance between the head 100 and the base 200, that is, a height of the head 100 is adjustable. FIGS. 19, 20A, and 20B are views of a height adjustment structure of the column 300 according to an embodiment.

With reference to FIGS. 1, 19, 20A, and 20B, the column 300 according to this embodiment may include a first column 310, a second column 320, and a height adjustment unit 330. A first side of the first column 310 according to this embodiment may be coupled with the head 100. In this case, for example, the first column 310 may have a shape of a cylinder. However, the first column 310 may, of course, have a shape of a polyprism, such as one having a rectangular cross section.

A first side of the second column 320 according to this embodiment may be coupled with the base 200. In this case, a shape of the second column 320 may correspond to a shape of the first column 310. According to this embodiment, for example, the second column 320 may have a shape of a cylinder. The second column 320 may have a shape that correspondingly varies with the shape of the first column 310.

A second side of the second column 320, that is, an upper portion of the second column 320 may be inserted from under a second side of the first column 310, that is, from under a lower portion of the first column 310. Accordingly, the height of the head 100 may be adjustable according to a length of a portion of the second column 320 which is inserted from under the lower portion of the first column 310. The height adjustment unit 330 according to this embodiment may enable the first column 310 to ascend or descend with respect to the second column 320 such that the height of the head 100 may be adjusted.

According to this embodiment, for example, the height adjustment unit 330, as illustrated in FIGS. 19, 20A, and 20B, may include a rack 331, a pinion 332, and a damper 333. The rack 331 according to this embodiment may be mounted on one of the first column 310 or the second column 320. For example, as illustrated in FIGS. 18A to 18C, 20A, and 20B, the rack 331 may be mounted on the first column 310.

According to this embodiment, for example, the rack 331 may be formed along a vertical direction on a first guide 311 coupled with an inner circumferential surface of the first column 310. The pinion 332 according to this embodiment may be rotated by being engaged with the rack 331. The pinion 332 may be coupled with the second column 320 (or the first column 310 (hereinafter omitted in this case)) with the damper 333 therebetween, and thus, may be moved in the vertical direction along with the second column 320.

The damper 333 according to this embodiment may be mounted on the other one of the first column 310 or the second column 320. That is, in a case in which the rack 331 is mounted on the first column 310, the damper 333 may be mounted on the second column 320. In a case in which the rack 331 is mounted on the second column 320, the damper 333 may be mounted on the first column 310. According to this embodiment, for example, the damper 333 may be mounted in the second column 320. According to this embodiment, for example, the damper 333 may be mounted on a second guide 321 coupled with an inner circumferential surface of the second column 320.

The damper 333 according to this embodiment may be connected to a rotational shaft of the pinion 332. When the pinion 332 is rotated by being engaged with the rack 331, the damper 333 enables the first column 310 to ascend or descend. In this case, the damper 333 exerts a load in such a manner that a position to which the first column 310 ascends is maintained, and thus, the height of the head 100 is adjusted to a predetermined height.

Accordingly, when adjusting the height of the head 100, the user moves the head 100 in the vertical direction. Then, the rack 331 and the pinion 332 operate by being engaged with each other, and thus, it is possible for the head 100 to ascend or descend. When the user enables the head 100 to stop ascending or descending at a desired height, the head 100 stops ascending or descending at the desired height according to the load provided by the damper 333. Thus, the head 100 may be adjusted to the desired height.

For example, as illustrated in FIGS. 20A and 20B, a guide groove 312 may be formed in the vertical direction in the first guide 311. A guide rib (not illustrated) may be formed on the second guide 321. Movement in the vertical direction of the guide rib may be guided in a state in which the guide rib is inserted into the guide groove 312. Accordingly, relative movement in the vertical direction between the first guide 311 and the second guide 321 may be stably guided, and thus, the first column 310 may be moved stably in the vertical direction.

For example, in the portable air flow apparatus 10 according to this embodiment, as described above, the head 100 is enabled to rotate in the lateral direction about the column 300. The portable air flow apparatus 10 according to this embodiment may be configured to include a rotation unit 700 that couples the column 300 and the base 200 with each other in such a manner that the column 300 is rotated with respect to the base 200.

Figure 21:
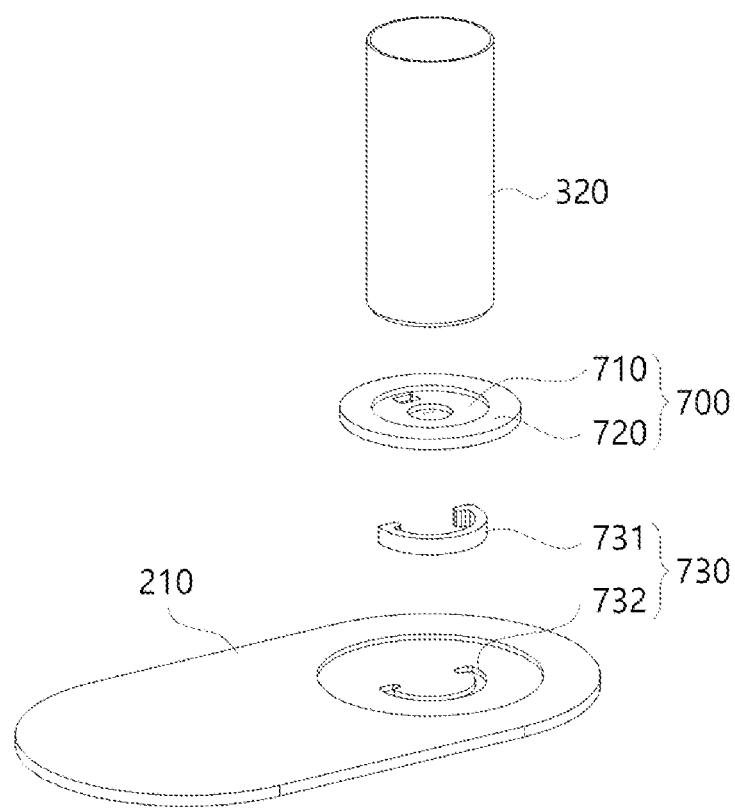
FIGS. 21 and 22 are views of a rotation unit according to an embodiment.
Figure 22:
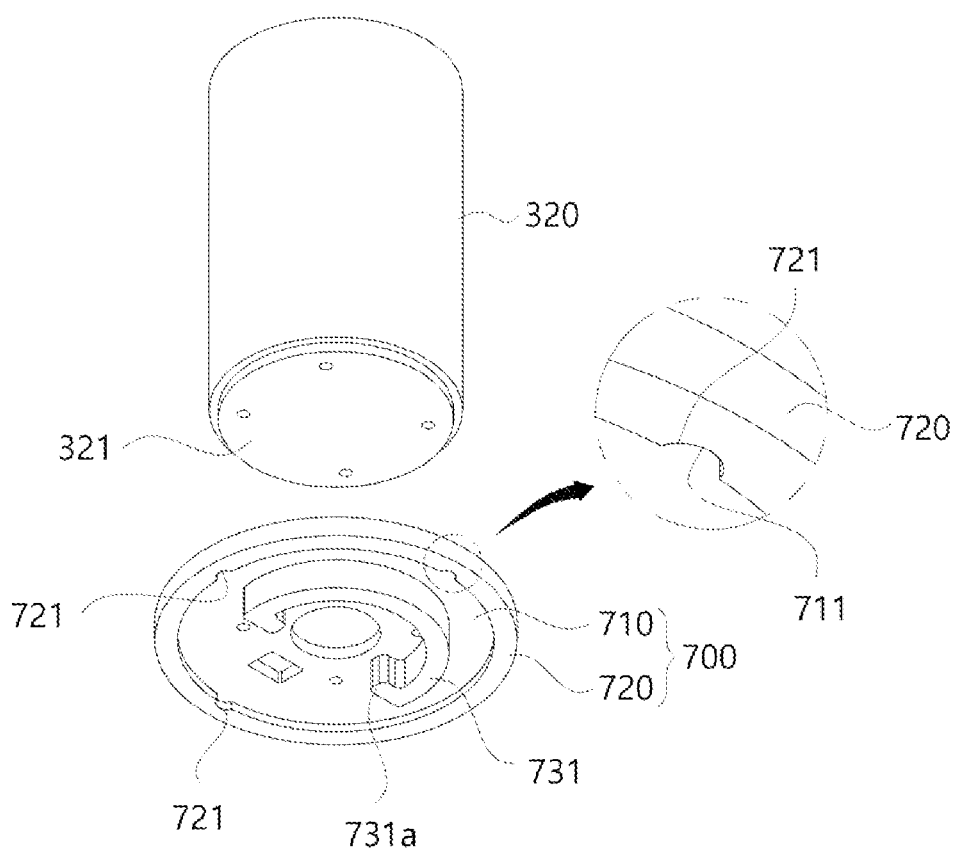

FIGS. 21 and 22 are views of a rotation unit according to an embodiment. With reference to FIGS. 21 and 22, rotation unit 700 according to this embodiment may include a first rotation member 710 and a second rotation member 720.

The first rotation member 710 may be mounted underneath the column 300. In this case, according to this embodiment, for example, the column 300 may include the first column 310 and the second column 320. Accordingly, for example, the first rotation member 710 may be mounted underneath the second column 320.

The second rotation member 720 may be mounted in the base 200. The second rotation member 720 may rotatably support the first rotation member 710 in such a manner that the column 300 is rotatable.

According to this embodiment, for example, the first rotation member 710 may have a shape of a circular plate. For example, the second rotation member 720 may have a shape of a circular ring in such a manner as to be rotatably supported along an inner circumferential surface of the first rotation member 710. Accordingly, the first rotation member 710 may be stably rotatable inside of the second rotation member 720.

A blocking protrusion 711 may be provided on an outer circumferential surface of the first rotation member 710 in such a manner that it radially protrudes outward therefrom, for example. A plurality of blocking grooves 721 may be formed in an inner circumferential surface of the second rotation member 720 spaced apart by a predetermined angle. When the first rotation member 710 is rotated, the blocking protrusion 711 may be inserted into the blocking groove 721 formed at a specific angle, thereby blocking movement of the first rotation member 710. Thus, the user may recognize rotation at a predetermined angle. The predetermined angle may be maintained as long as an external force is not applied.

For example, three blocking grooves 721 may be formed spaced apart by an angle of 90°. When the three blocking grooves 721 are formed spaced apart by an angle of 90°, the base 200 and the head 100 may be positioned in such a manner as to be aligned with each other, as illustrated in FIG. 2A, and the head 100 may be rotated by an angle of 90° to the left or to the right with respect to the base 200, as illustrated in FIGS. 2B and 2C. Accordingly, the blocking grooves 721 may be spaced apart by an angle at which the head 100 is rotated relatively frequently, among rotational angles of the head 100. Thus, convenience in using the portable air flow apparatus 10 may be increased.

The rotation unit 700 according to this embodiment may further include a rotation control unit 730. For example, the rotation control unit 730 may control rotation of the first rotation member 710 in such a manner that the first rotation member 710 is rotated by up to a predetermined angle to the left or to the right from a position at which the head 100 is aligned with the base 200. According to this embodiment, for example, as illustrated in FIGS. 2A to 2C, the rotation control unit 730 may control rotation of the first rotation member 710 in such a manner that the first rotation member 710 is rotatable by up to an angle of 180° in the leftward-rightward or lateral direction, that is, by up to 90° to the left and by up to 90° to the right.

According to this embodiment, for example, the rotation control unit 730 may include a control member 731 and a control groove 732. The control member 731 may be coupled with the first rotation member 710. The control groove 732 may be formed in the base 200. The control groove 732 may be formed in the plate-like surface of the base 200 in such a manner as to have a shape of a semicircle having an internal angle of 180°. A control protrusion 731a formed on the control member 731 may be rotated in a state of being inserted in the control groove 732, but within an angle range of 180°. The control protrusion 731a cannot be rotated out of the angle range of 180° because movement thereof out of the angle range of 180° is blocked by the control groove 732.

With the above-described configuration, the head 100 is formed in such a manner as to be rotatable up to 90° to the left or to the right, that is, only within an angle range of 180°. Thus, a phenomenon in which a cable connected from the base 200 to the head 100, for example, a power cable or a signal (not illustrated) cable for rotating or controlling the fan motor 420, is twisted may be minimized.

In addition, as illustrated in FIGS. 2A to 2C, it is possible to use the portable air flow apparatus 10 according to this embodiment at various angles in a rotational range of 180° in various positions.

Figure 23:
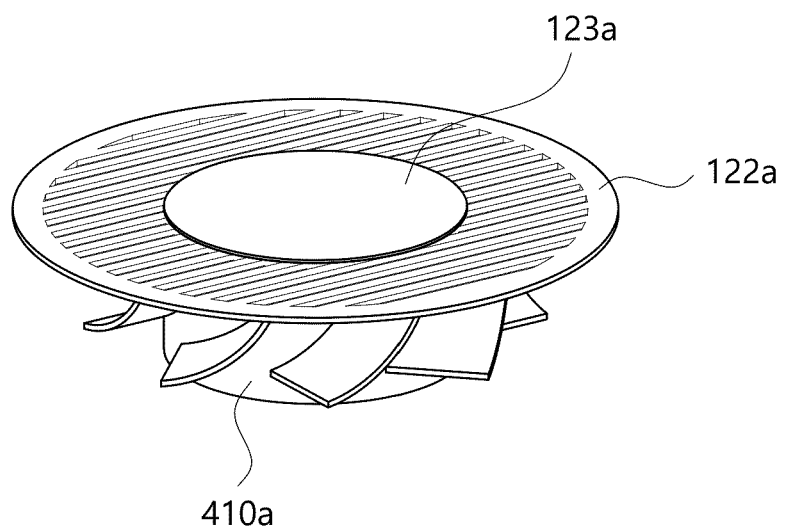
FIGS. 23 to 25 are views illustrating an integrated discharge fan and fan motor according to an embodiment.
Figure 24:
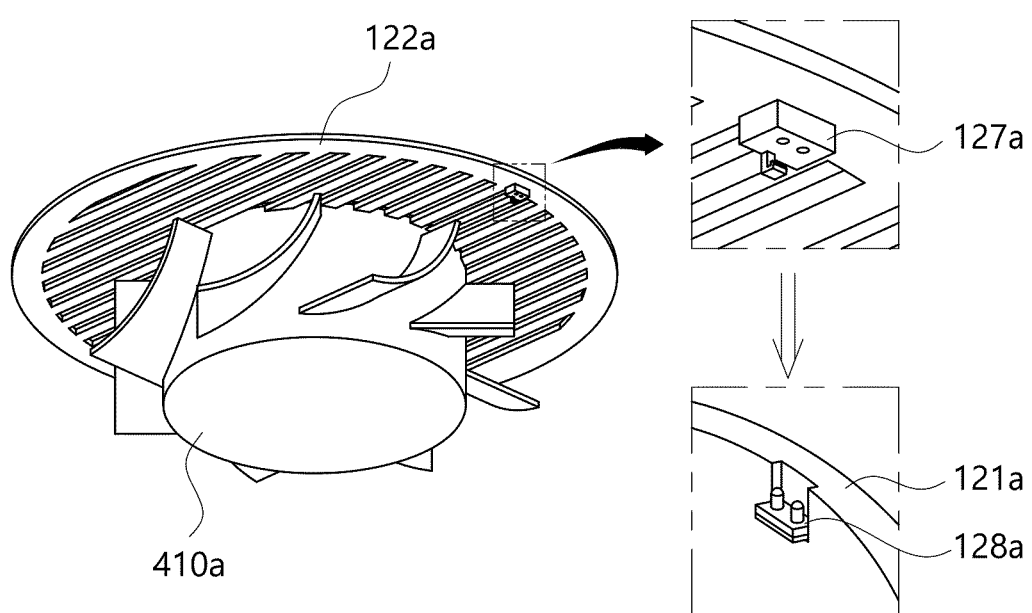
Figure 25:
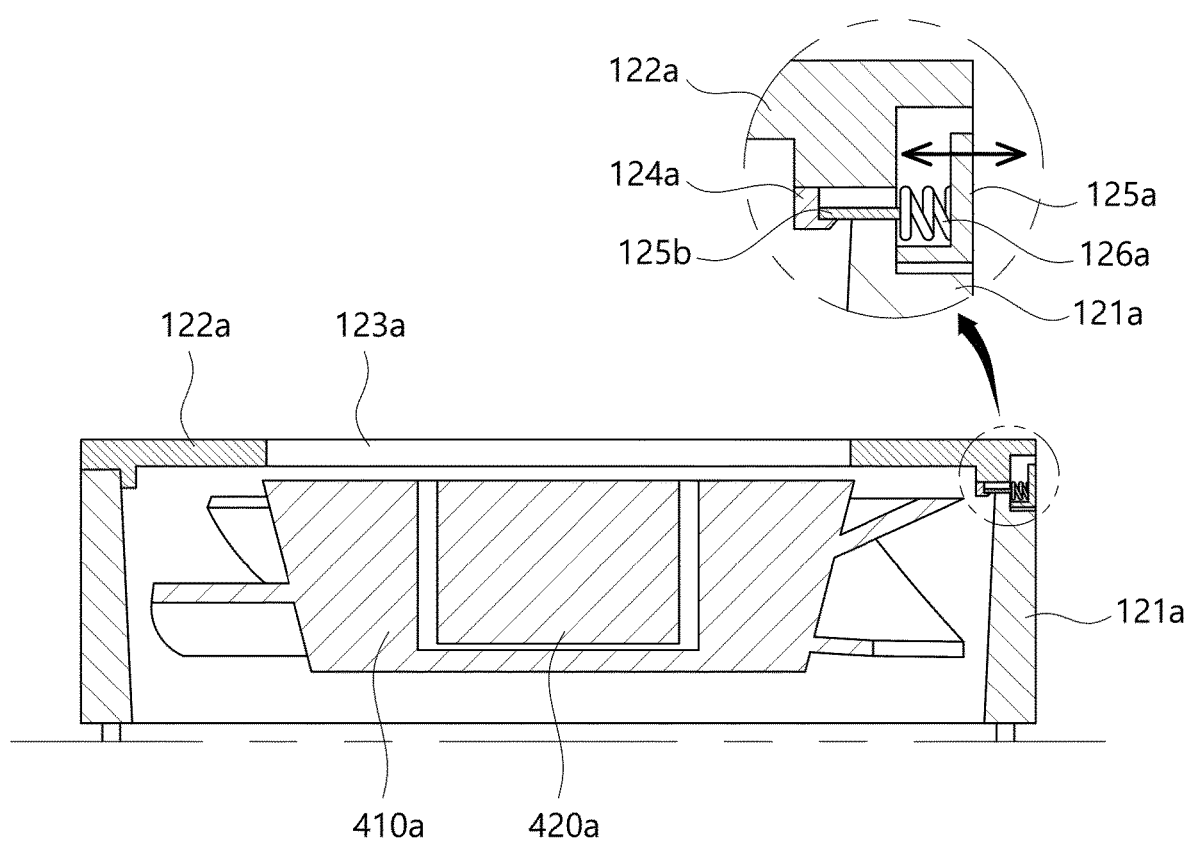

In the above-described embodiment, the discharge fan 410 and the fan motor 420 of the portable air flow apparatus 10 according to this embodiment are described above as being arranged in the vertical direction over the column 300. The discharge fan 410 and the fan motor 420 according to this embodiment may be integrated into one piece and may be mounted over the column 300, for example. FIGS. 23 to 25 are views illustrating an integrated discharge fan and fan motor according to an embodiment.

With reference to FIGS. 23 to 25, the discharge fan 410 may be mounted inside of the discharge outlet 120, for example, inside of the fan housing 121. The fan motor 420 may be mounted inside of the discharge fan 410 and may rotate the discharge fan 410.

In addition, the discharge outlet 120 according to this embodiment may further include a shaft connection member 123a. The shaft connection member 123a may connect a rotational shaft of the discharge fan 410 and the discharge grill 122 to each other such that the discharge fan 410 is rotatable inside of the fan housing 121. Accordingly, when the discharge grill 122 is removed from the fan housing 121, with the shaft connection member 123a, it is possible to remove the discharge fan 410 and the fan motor 420 together.

With the above-described configuration, the discharge fan 410 and the fan motor 420 which are integrated into one piece are accommodated inside of the fan housing 121. As described above, the center of gravity of the portable air flow apparatus 10 according to this embodiment may be positioned in the column 300 side of the portable air flow apparatus 10. Thus, the portable air flow apparatus 10 may be prevented from falling over.

In order to connect the power cable to the fan motor 420 mounted inside of the discharge fan 410, the portable air flow apparatus 10 according to this embodiment may further include a first connector 127a and a second connector 128a. The first connector 127a may be mounted on the discharge grill 122 and may be electrically connected to the fan motor 420. The second connector 128a may be mounted, at a position corresponding to a position of the first connector 127a, in the fan housing 121. When the discharge grill 122 is mounted in the fan housing 121, the second connector 128a may be connected to the first connector 127a and supply electric power to the fan motor 420. The second connector 128a may be electrically connected to a printed circuit board mounted in the base 200 through the column 300. When the first connector 127a and the second connector 128a are connected to each other, the second connector 128a may supply electric power to the fan motor 420.

The discharge outlet 120 according to this embodiment, as illustrated in FIG. 25, may include a blocking jaw 124a, a blocking lever 125a or 125b, and an elastic member or spring 126a. The blocking jaw 124a may be mounted on the discharge grill 122. When the discharge grill 122 is mounted in the fan housing 121, the blocking jaw 124a may be inserted into the fan housing 121.

The blocking lever 125a or 125b may be mounted in the fan housing 121 such that movement thereof is blocked by and released from the blocking jaw 124a. Accordingly, in a state in which movement of the blocking lever 125a or 125b is blocked by the blocking jaw 124a, the discharge grill 122 may be fixed to the fan housing 121 in a state of being coupled therewith. In a case in which movement of the blocking lever 125a or 125b is released from the blocking jaw 124a, it is possible to separate the discharge grill 122.

The elastic member 126a according to this embodiment may elastically press the blocking lever 125a or 125b in a direction in which the movement of the blocking lever 125a or 125b is blocked by the blocking jaw 124a. For example, the blocking lever 125a or 125b may include a lever portion 125a and a blocking portion 125b. The lever portion 125a may be positioned outside of the fan housing 121 and may be pulled by a user's hand. The blocking portion 125b may extend from the lever portion 125a toward the inside of the fan housing 121. The movement of blocking portion 125b may be blocked by and released from the blocking jaw 124a. For example, the elastic member 126a may be a tension spring and be configured such that, when the lever portion 125a is pulled in a blocking direction, a state in which movement of the blocking portion 125b is blocked by the blocking jaw 124a is maintained.

With the above-described configuration, when the user pulls the lever portion 125a, an elastic force of the tension spring is overcome. Thus, the blocking portion 125b moves back from the blocking jaw 124a, thereby releasing the movement thereof. Thus, it is possible to separate the discharge grill 122.

Figure 26:
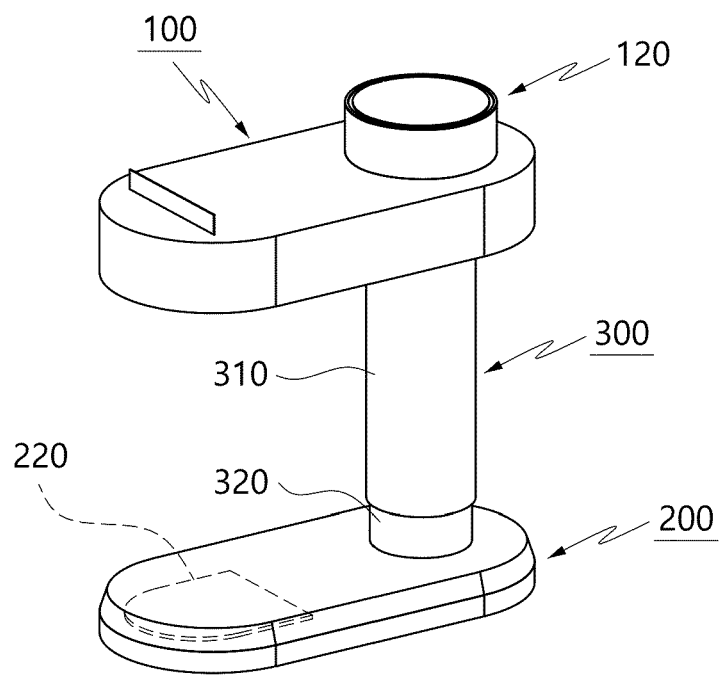
FIG. 26 is a perspective view of a portable air flow apparatus including a weight plate according to another embodiment.

The base 200 according to another embodiment, as described in FIG. 26, may further include a weight plate 220. The weight plate 220 may be formed of a metal material, for example, and may be mounted inside of the base 200. Thus, the column 300 and the head 100 may be prevented from falling over.

As described above, the head 100 and the base 200 according to an embodiment are coupled with each other in such a manner as to be horizontally spaced apart from the column 300. Further, the head 100 is rotatably mounted in the lateral direction. For this reason, the weight plate 220 formed of a metal material which is relatively heavy may be built into the base 200. Accordingly, the center of gravity may be positioned below. The portable air flow apparatus 10 according to this embodiment may be prevented from falling over.

The portable air flow apparatus 10 according to this embodiment may further include a battery module 800. The power cable for supplying electric power in everyday use may be provided for the portable air flow apparatus 10 according to this embodiment. The battery module 800 may be built into the portable air flow apparatus 10 in order to increase portability. Thus, electric power necessary to drive the fan motor 420, for example, may be supplied.

Figure 27A:
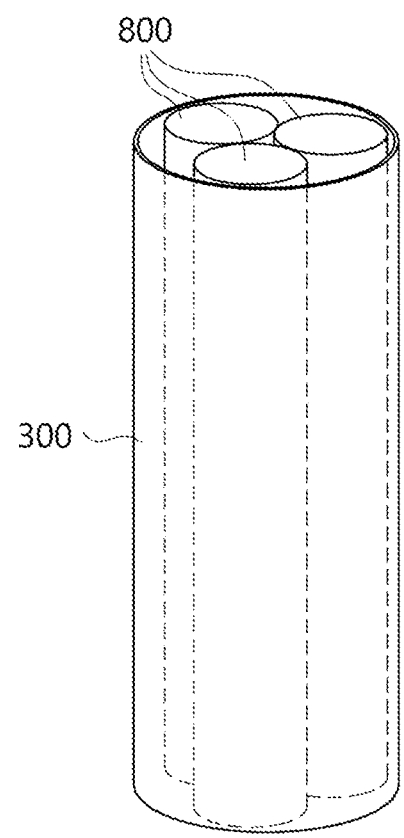
FIGS. 27A and 27B are views of a portable air flow apparatus including a battery module according to an embodiment.
Figure 27B:
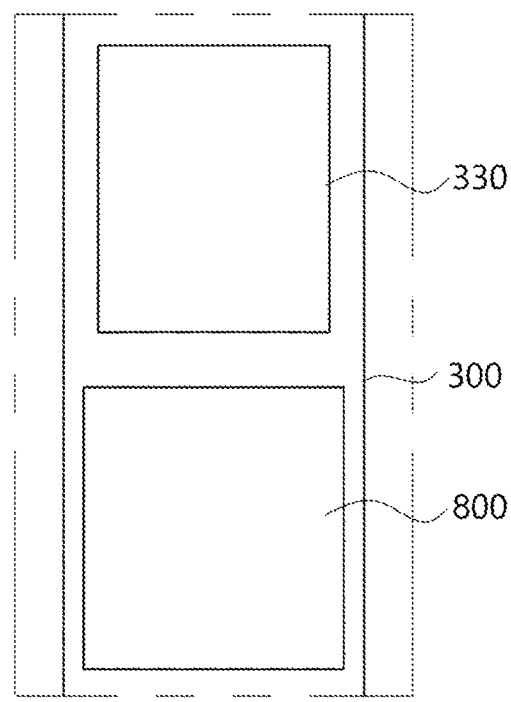

According to this embodiment, for example, the battery module 800, as illustrated in FIGS. 27A and 27B, is built into the column 300. Accordingly, primary components may be arranged in the column 300 side of the portable air flow apparatus 10. Accordingly, the center of gravity may be positioned in the column 300 side of the portable air flow apparatus 10. Thus, the portable air flow apparatus 10 may be prevented from falling over.

For example, the battery module 800 may be positioned in a lower portion of the column 300. In a case in which the above-described height adjustment unit 330 is mounted in the column 300, as illustrated in FIG. 27B, the height adjustment unit 330 may be positioned in an upper portion of the column 300, and the battery module 800 may be positioned in the lower portion of the column 300. Accordingly, the height of the column 300 is adjustable, and due to the built-in battery module 800, the portable air flow apparatus 10 according to this embodiment may be prevented more effectively from falling over.

In addition, in a case in which a plurality of battery modules 800 is mounted, as illustrated in FIG. 27A, the plurality of battery modules 800 may be arranged in parallel in the horizontal direction inside of the column 300. Accordingly, the portable air flow apparatus 10 according to this embodiment may be kept more stably in an upright position. Thus, the portable air flow apparatus 10 may be prevented from falling over.

Figure 28:
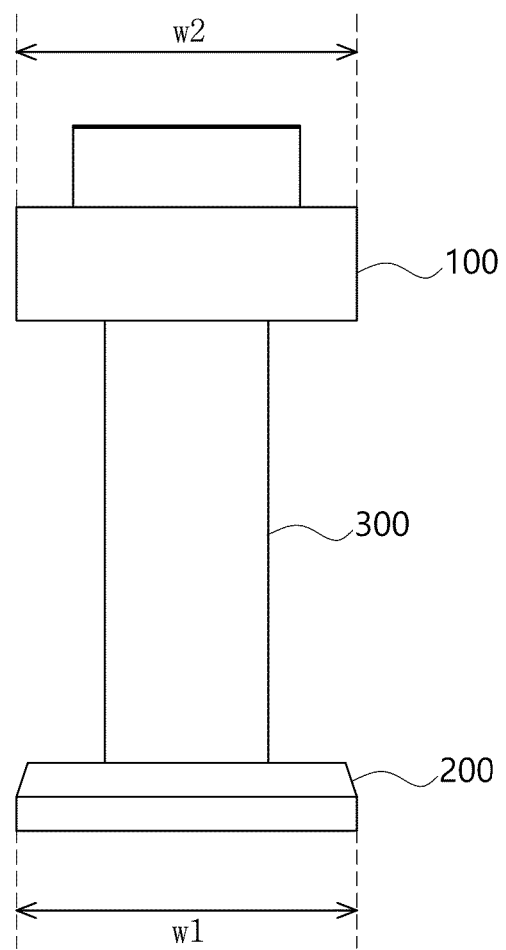
FIG. 28 is a front view of a portable air flow apparatus according to another embodiment.

In addition, according to this embodiment the portable air flow apparatus 10, as illustrated in FIG. 28, the base 200 and the head 100 may be formed such that a width w1 of the base 200 in a direction intersecting a direction in which the suction inlet 110 and the discharge outlet 120 are spaced apart from each other is the same as or greater than a width w2 of the head 100. Accordingly, the portable air flow apparatus 10 may be kept more stably in the upright position, and thus, the portable air flow apparatus 10 may be effectively prevented from falling over.

Figure 29:
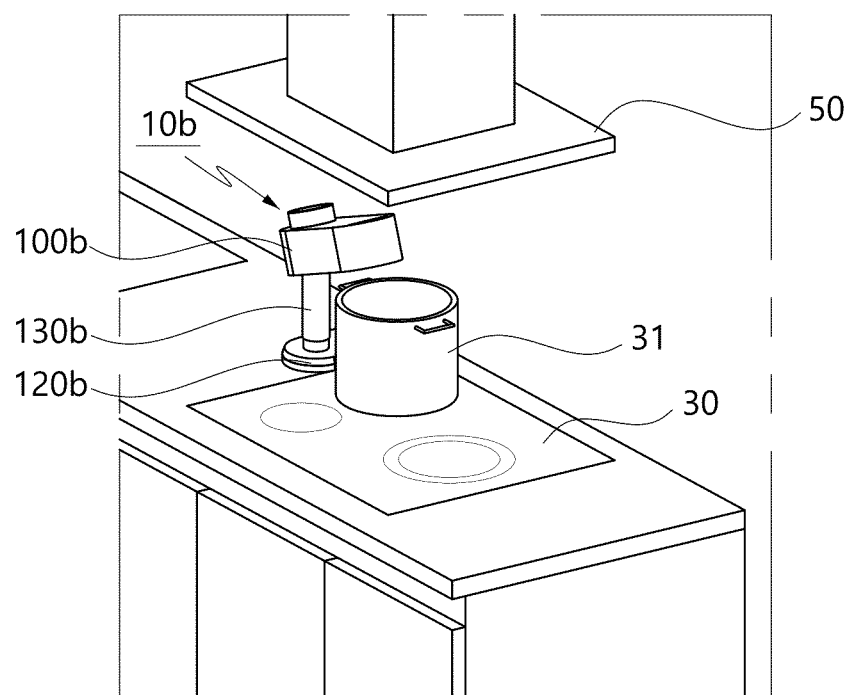
FIG. 29 is a view illustrating a state of use of the portable air flow apparatus of FIG. 28.

In the above-described embodiments, the head 100 according to an embodiment is rotatable in the leftward-rightward or lateral direction such that the height thereof is adjustable. As another example, as illustrated in FIG. 29, the head 100 according to this embodiment may be coupled with the column 300 in such a manner that an angle at which the head 100 is inclined in the vertical direction with respect to the column 300 is adjustable. Accordingly, in addition to the height of the head 100, an angle at which air is suctioned is adjustable. In addition, the head 100 may be effectively used for a cooking utensil a height of which falls out of a range to which the height of the head 100 is adjustable.

In this embodiment, filter unit 500 mounted in suction inlet 110 side of head 100 may include deodorizing filter 512, oil mist filter 513, and free filter 514. The deodorizing filter 512, the oil mist filter 513, and the free filter 514 may be formed of a non-woven cloth, a corrugated activated carbon material, and an aluminum mesh material, respectively, for example. Accordingly, in the above-described embodiment, these materials are suitable for the portable air flow apparatus 10 in terms of removing oil mist occurring during cooking.

For example, the portable air flow apparatus 10 according to this embodiment may be configured to function as an air purifier. As described above, it is possible to replace the deodorizing filter 512 through the inlet 171 in the casing main body 140, and it is possible to replace the oil mist filter 513 by replacing the filter roll 610. Likewise, the free filter 514 may be detachably mounted in the lower casing 160.

In order to operate the portable air flow apparatus 10 as an air purifier, the user may use a filter(s) suitable for air purification instead of the deodorizing filter 512, the oil mist filter 513, or the free filter 514 described above. Thus, a purpose for which the portable air flow apparatus 10 according to this embodiment is used may be expanded.

For example, the free filter 514 may be replaced with a mesh filter of a plastic material suitable for the air purifier. In addition, a HEPA filter and a deodorizing filter may be sequentially mounted at a position at which the above-described deodorizing filter 512 is mounted. In this case, the portable air flow apparatus 10 may be used with the oil mist filter 513 left mounted or removed.

A method for controlling a portable air flow apparatus according to an embodiment will be described below with reference to FIGS. 30A to 40. In this embodiment described below, for example, a portable air flow apparatus, such as portable air flow apparatus 10 described above, may be used as a portable hood.

Figure 30A:
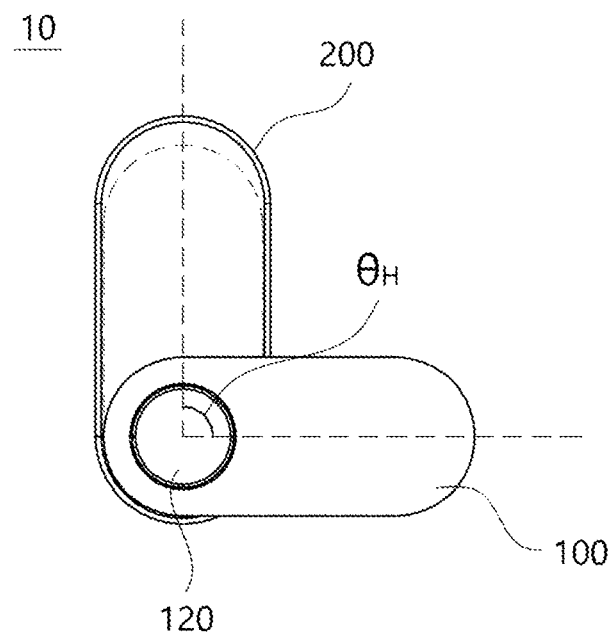
FIGS. 30A and 30B are views illustrating rotation in a horizontal direction of a portable air flow apparatus according to still another embodiment.
Figure 30B:
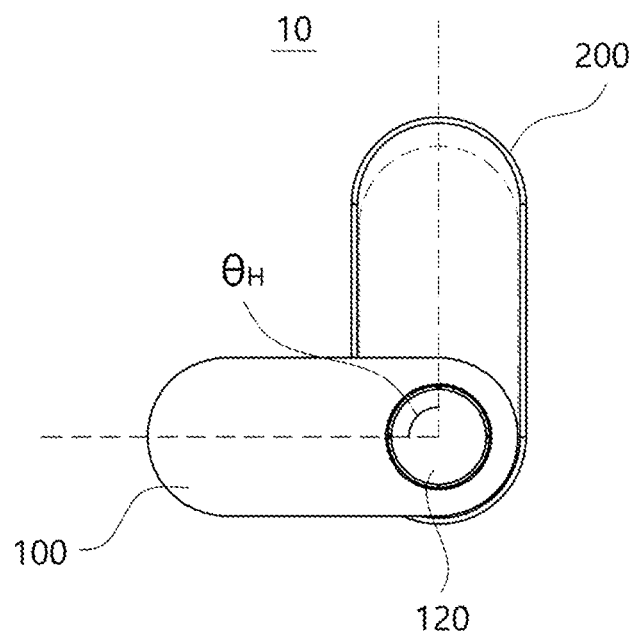

With reference to FIGS. 30A and 30B, as described above, when head 100 rotates in a horizontal direction about column 300, suction inlet 110 formed at an opposite side of the column 300 may rotate in the lateral or leftward-rightward direction. Thus, an angle 8H in the horizontal direction may be adjusted. In this embodiment, for example, as described above, the head 100 may be provided such that it is rotatable by up to 90° to the left and by up to 90° to the right in the horizontal direction, as illustrated in FIGS. 30A and 30B.

Figure 31A:
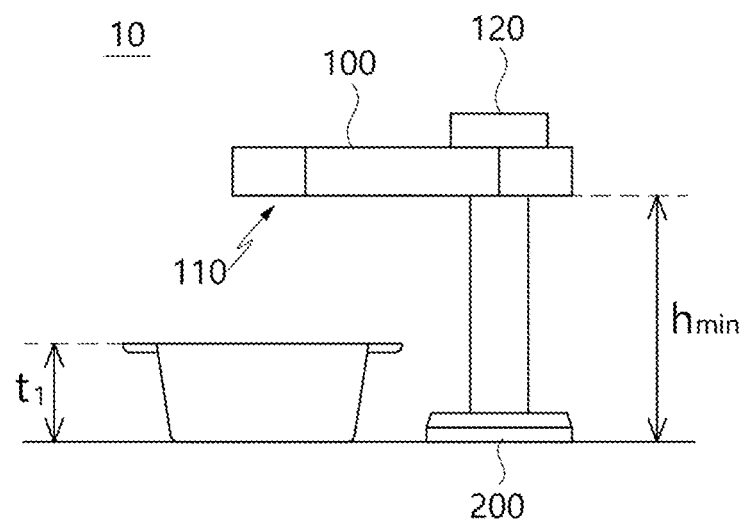
FIGS. 31A and 31B are views illustrating adjustment of a height of the portable air flow apparatus of FIGS. 30A-30B.
Figure 31B:
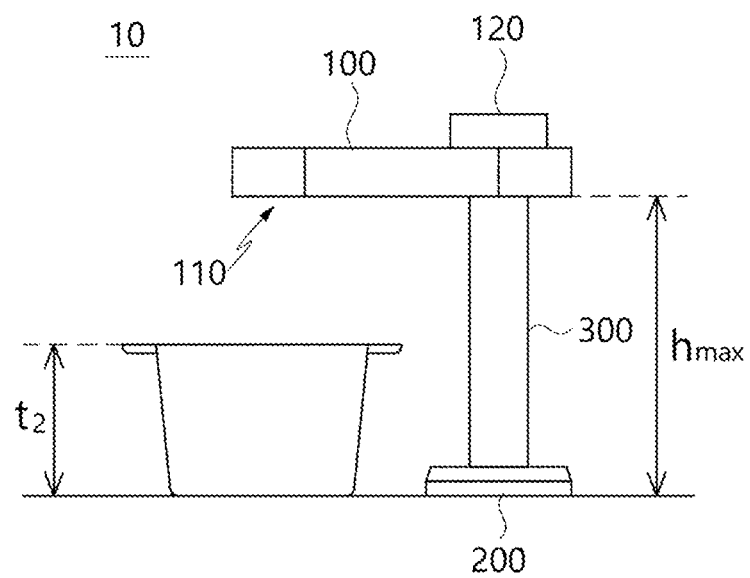

FIGS. 31A and 31B are views illustrating adjustment of a height of a portable air flow apparatus according to an embodiment. As illustrated in FIG. 31A, in a case in which a height $t_1$ of the cooking utensil 31 is relatively small, the head 100 may be enabled to descend in such a manner that the height thereof corresponds to the height $t_1$ of the cooking utensil 31. Thus, the suction inlet 110 may be positioned vertically adjacent to the cooking utensil 31.

In contrast, as illustrated in FIG. 31B, in a case in which a height $t_2$ of the cooking utensil 31 is relatively great, the head 100 may be enabled to ascend in such a manner that the height thereof corresponds to the height $t_2$ of the cooking utensil 31. Thus, a position of the head 100 may be adjusted.

In this embodiment, a minimum height of the head 100 may be defined as $h_{min}$, and a maximum height of the head 100 may be defined as $h_{max}$.

Figure 32:
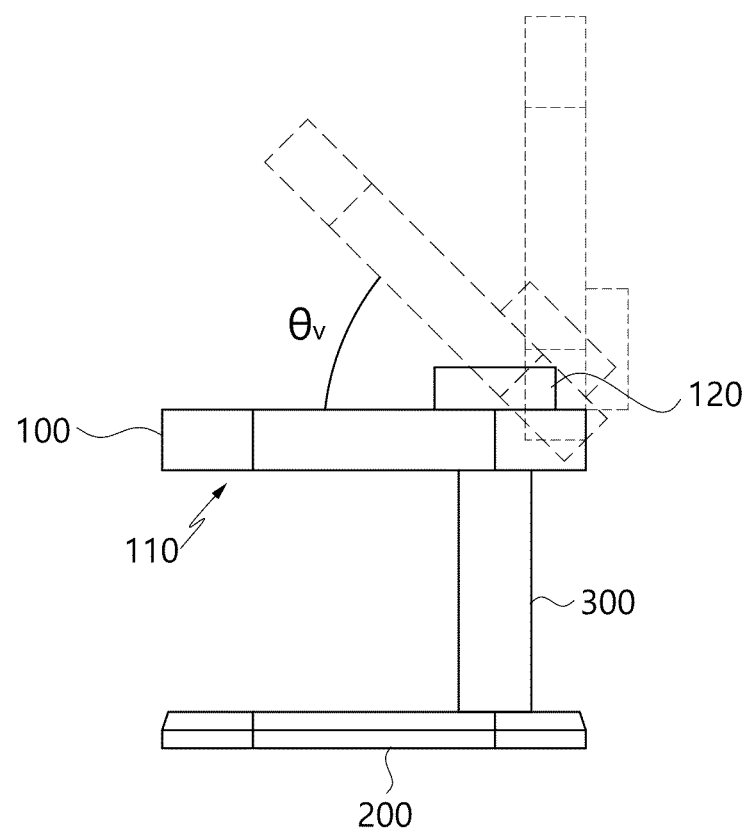
FIG. 32 is a view illustrating adjustment of an angle in a vertical direction of the portable air flow apparatus of FIGS. 30A-30B.

For example, the head 100 of the portable air flow apparatus 10 according to this embodiment, as illustrated in FIG. 32, may be provided in such a manner that an angle θv in the vertical direction is adjustable. For example, the head 100 may rotate vertically with respect to the column 300 in a state in which the head 100 is coupled by the hinge mechanism with the column 300. In this case, a structure in which the head 100 and the column 300 are coupled by the hinge mechanism with each other may be realized in various forms; however, embodiments are not limited to the various forms disclosed.

Figure 33:
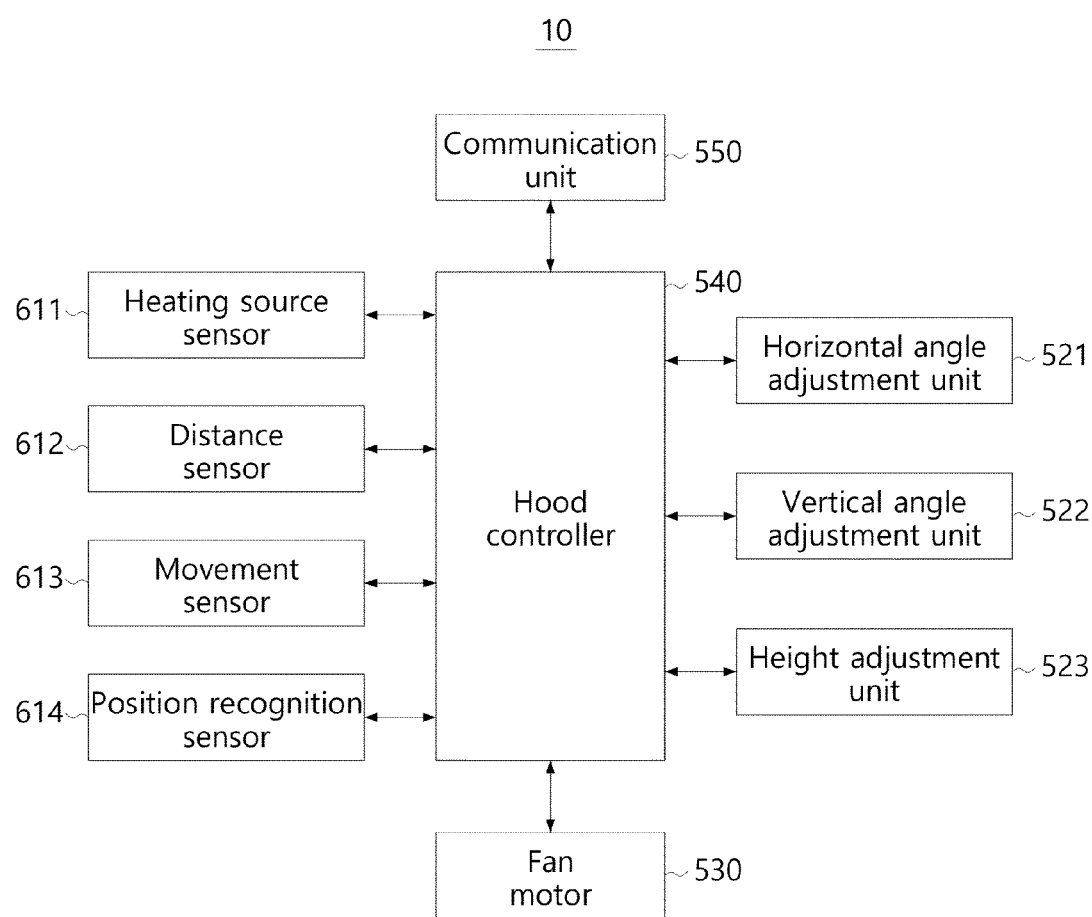
FIG. 33 is a control diagram of a method for controlling of a portable air flow apparatus according to an embodiment.

FIG. 33 is a control diagram of a portable air flow apparatus 10 according to an embodiment. With reference to FIG. 33, the portable air flow apparatus 10 according to this embodiment may include a horizontal angle adjustment unit 521.

The horizontal angle adjustment unit 521 according to this embodiment may adjust an angle in the horizontal direction of the head 100 under the control of a hood controller 540. For example, according to rotation of an actuator, such as a motor, the angle in the horizontal direction of the head 100 may be automatically adjusted to the left and to the right.

The portable air flow apparatus 10 according to this embodiment may also include a height adjustment unit 523. Under the control of the hood controller 540, the height adjustment unit 523 may enable the head 100 to ascend or descend, and thus, may adjust the height of the head 100. As described above, in a case in which an ascending and descending unit includes a rack and a pinion, driving of the motor may rotate the pinion, and thus, may enable the first column 310 to ascend or descend.

The portable air flow apparatus 10 according to this embodiment may further include a vertical angle adjustment unit 522. Under the control of the hood controller 540, the vertical angle adjustment unit 522 may adjust the angle in the vertical direction of the head 100. For example, the angle in the vertical direction of the head 100 may be automatically adjusted according to the rotation of the actuator, such as a motor.

The portable air flow apparatus 10 according to this embodiment may include a plurality of sensors 611, 612, 613, and 614. The sensors according to this embodiment may collect various pieces of information. The hood controller 540 may control the horizontal angle adjustment unit 521, the height adjustment unit 523, the vertical angle adjustment unit 522, and fan motor 530, for example, on the basis of the various pieces of information.

The sensors 611, 612, 613, and 614 according to this embodiment may include a heating source sensor 611. The heating source sensor 611 may measure a position of a heating source by detecting heat of each of a plurality of cooktops of the cooking heating equipment 30 or by detecting heat of the cooking utensil 31 in use for actual cooking. For example, the heating source sensor 611 may be a non-contact type infrared-ray sensor.

The sensors 611, 612, 613, and 614 according to this embodiment may include a distance sensor 612. The distance sensor 612 may measure a distance between the head 100 and the cooking utensil 31 and may measure a height of the cooking utensil 31. For example, the distance sensor 612 may be a supersonic-wave type sensor, or an infrared-ray type sensor, for example.

The sensors 611, 612, 613, and 614 according to this embodiment may further include a movement sensor 613. The movement sensor 613 may detect movement below the head 100, that is, movement between the cooking utensil 31 and the head 100. For example, the movement sensor 613 may be an infrared-ray type sensor, or a supersonic-wave type sensor, for example.

The hood controller 540 according to this embodiment may control the horizontal angle adjustment unit 521, the vertical angle adjustment unit 522, the height adjustment unit 523, and the fan motor 530 on the basis of the various pieces of information detected by the sensors 611, 612, 613, and 614. For example, when the position of the heating source is measured by the heating source sensor 611 and the height of the cooking utensil 31 is measured by the distance sensor 612, the hood controller 540 may control the horizontal angle adjustment unit 521 and the height adjustment unit 523 according to the position of the heating source and the height of the cooking utensil 31 in such a manner as to adjust at least one of the angle in the horizontal direction of the head 100 or the height of the head 100. Accordingly, the suction inlet 110 of the head 100 may automatically move to over a position of the heating source, that is, over the cooktop or the cooking utensil 31 in use for cooking. Then, the suction inlet 110, positioned over the cooking utensil 31, may suction oil mist.

The method by which the hood controller 540 controls the portable air flow apparatus 10 configured as described above according to this embodiment will be described below with reference to FIG. 34.

First, a start command for operating the portable air flow apparatus 10 may be input (S70). For example, the start command may be input by operating an operation button provided at an outside of the portable air flow apparatus 10 according to the previous embodiment.

Alternatively, the start command may be input from the outside. For example, the start command may be transmitted from the cooking heating equipment 30 or the stationary hood 50. More specifically, as illustrated in FIG. 33, the portable air flow apparatus 10 may further include a communication unit 550.

The communication unit 550 may perform wireless communication with the cooking heating equipment 30 or the stationary hood 50. For example, the communication unit 550 may communicate with the cooking heating equipment 30 or the stationary hood 50 through a short-distance wireless communication standard, such as Wi-Fi or Bluetooth.

The cooking heating equipment 30 or the stationary hood 50 may make a connection to the portable air flow apparatus 10 through the communication unit 550 and may operate in conjunction with the portable air flow apparatus 10. For example, when the user turns on the cooktop of the cooking heating equipment 30, the cooking heating equipment 30 may transmit the start command to the portable air flow apparatus 10 through the wireless communication. Likewise, when the user turns on the stationary hood 50, the stationary hood 50 may transmit the start command to the portable air flow apparatus 10.

When the start command is input, the hood controller 540 may perform a step or operation of initializing positioning (S71). In the initializing of the positioning, for example, positioning of the head 100 may be adjusted to initial positioning according to the start command. For example, the initial positioning may refer to a state in which a height h of the head 100 is increased to a maximum height $h_{max}$.

Accordingly, in a state in which a current position of the heating source or the height of the cooking utensil 31 is not measured, a situation in which the head 100 collides with the cooking utensil 31 may be prevented during a subsequent measuring of the position of the heating source. As described above, when the initializing of the positioning of the head 100 is performed, the measuring of the position of the heating source may be performed.

A step or operation of detecting a heating source may be performed in one of a conjunctional-operation detection mode and a single-operation detection mode. As described above, the portable air flow apparatus 10 may operate in conjunction with the cooking heating equipment 30. Accordingly, in a case in which the portable air flow apparatus 10 operates in conjunction with the cooking heating equipment 30 (S72), the conjunctional-operation detection mode for performing the detecting of the heating source may be executed (S73).

Figure 35:
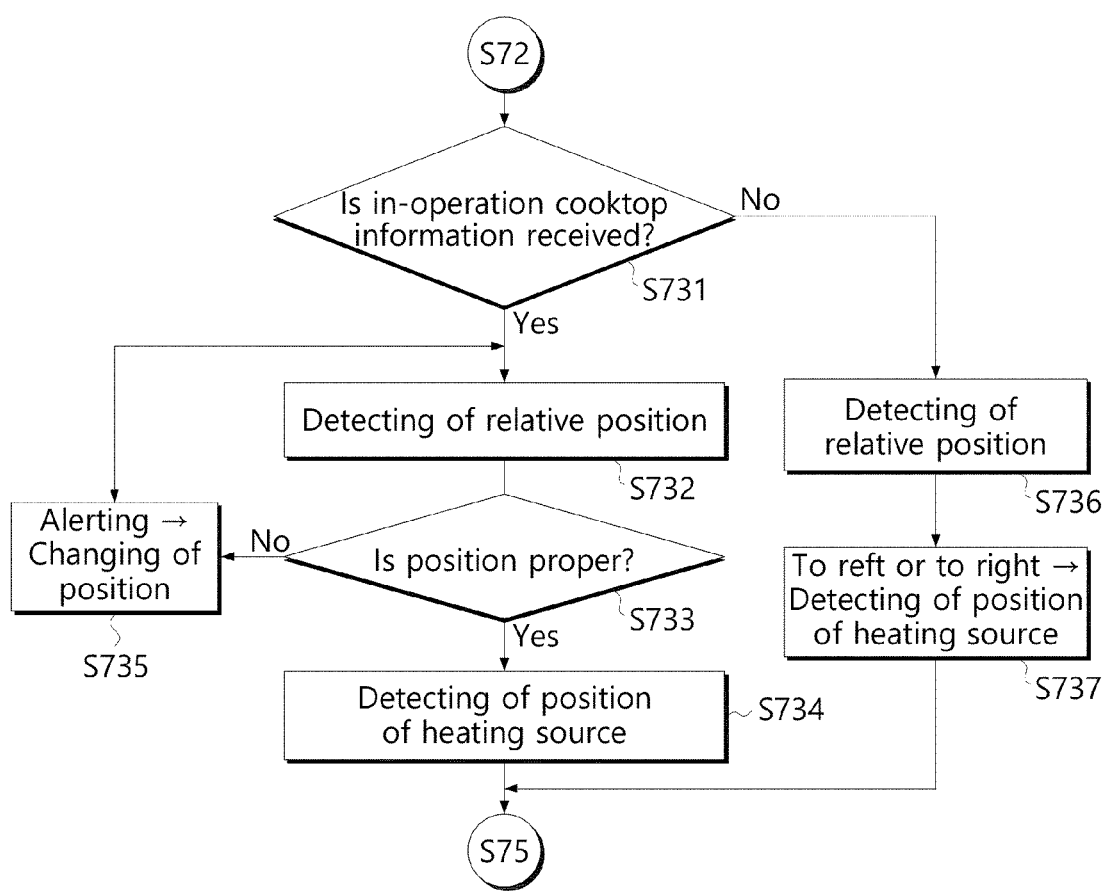
FIG. 35 is a flowchart of a method for controlling a portable air flow apparatus through a conjunctional-operation detection mode according to an embodiment.

FIG. 35 is a flowchart of a method for controlling a portable air flow apparatus using a conjunctional-operation detection mode according to an embodiment. With reference to FIG. 35, the method for controlling portable air flow apparatus 10 according to an embodiment may include measuring a relative position (S732 and S736). The term "relative position" of the portable air flow apparatus 10 may refer a relative position with respect to the cooking heating equipment 30. As illustrated in FIGS. 2B and 2C, the portable air flow apparatus 10, for example, may be arranged to the left or the right of the cooking heating equipment 30, and the relative position of the portable air flow apparatus 10 with respect to the cooking heating equipment 30 may be measured.

Figure 36A:
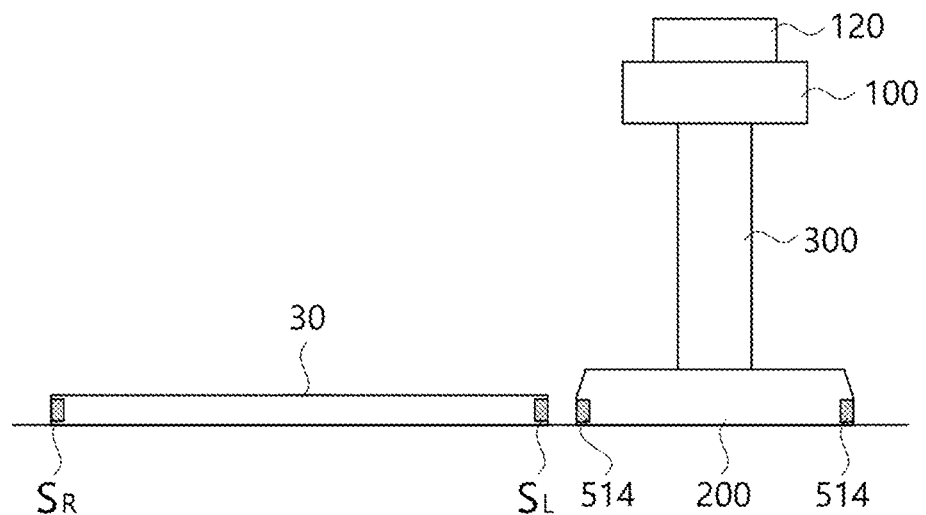
FIGS. 36A and 36B are views illustrating measuring a relative position in the method for controlling the portable air flow apparatus according to an embodiment.

The portable air flow apparatus 10, as illustrated in FIG. 33, may include position recognition sensor 614 as one of sensors 611, 612, 613, and 614. The position recognition sensor 614 may recognize the relative position of the portable air flow apparatus 10 with respect to the cooking heating equipment 30. FIG. 36A is a view illustrating a method in which a position recognition sensor recognizes a relative position of a portable air flow apparatus according to an embodiment.

As illustrated in FIG. 36A, position recognition modules SR and SL which are recognizable by the position recognition sensor 614 may be mounted on left and right (first and second lateral) edge portions, respectively, of the cooking heating equipment 30 that operates in conjunction with the portable air flow apparatus 10. The position recognition modules SR and SL, respectively, may be provided in a form that is distinguishable.

For example, the position recognition modules SR and SL may be provided in a form which is distinguishable based on a size of a magnet, a magnitude of a magnetic field, or a number of magnets, for example. The position recognition sensor 614 may be provided in the form of a Hall sensor capable of detecting a magnetic field. Alternatively, the position recognition modules SR and SL may be provided in the form of an RF or NFC tag, and the position recognition sensor 614 may be provided in the form of an RF or NFC reader that correspond to the RF or NF tag, respectively. The position recognition sensor 614 and the position recognition modules SR and SL, if capable of measuring lateral relative positions, may also be configured in other forms.

In the method for controlling the portable air flow apparatus according to an embodiment, before performing the measuring of the relative position, the method may be check whether or not in-operation cooktop information is received (S731). As described above, when the portable air flow apparatus 10 and the cooking heating equipment 30 operate in conjunction with each other and the start command is transmitted from the cooking heating equipment 30, the cooking heating equipment 30 may transmit in-operation cooktop information on a cooktop which is turned on among a plurality of cooktops $F_1$, $F_2$, and $F_3$ illustrated in FIG. 36B.

In a case in which the in-operation cooktop information is received, as described above, the measuring of the relative position is performed (S732), and then it may be determined whether or not the relative position of the portable air flow apparatus 10 is proper (S733). For example, in a state in which, according to the in-operation cooktop information, the cooktop $F_1$ is recognized as being turned on among the cooktops $F_1$, $F_2$, and $F_3$ illustrated in FIG. 36B, when the result of performing the measuring of the relative position is that the portable air flow apparatus 10 is arranged to the right, it may be determined that the relative position of the portable air flow apparatus 10 is not proper. At this point, the hood controller 540 may alert the user that the relative position of the portable air flow apparatus 10 needs to be changed, through, for example, sound produced by a speaker or through a visual expression displayed on a screen (S735).

In contrast, in a case in which it is determined that the relative position of the portable air flow apparatus 10 is proper, measuring of the position of the heating source may be performed (S734). At this point, in a case in which the in-operation cooktop information is received and in which the relative position is proper, the cooktop in operation is in a state in which the position thereof is measured. Therefore, the position of the cooktop in operation may be automatically measured as the position of the heating source.

Figure 36B:
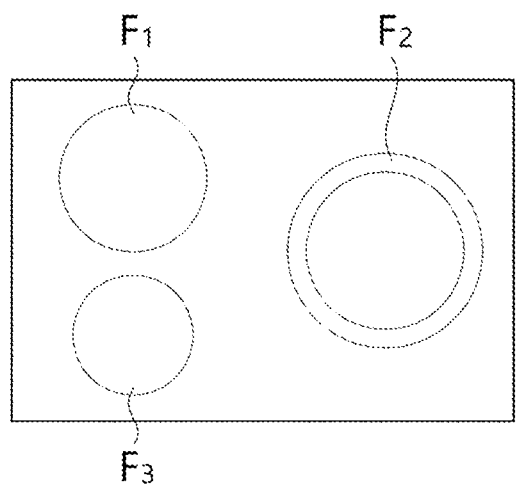

As another example, as illustrated in FIG. 36B, an angle by which the head 100 is rotated may vary according to a position in the vertical direction with reference to FIG. 36B. Therefore, the position of the heating source may be detected more precisely while rotating the head 100.

At this point, in the measuring of the position of the heating source (S734), by measuring the relative position, a state is attained in which it is recognized whether the cooking heating equipment 30 is positioned to the left of the portable air flow apparatus 10 or to the right thereof. Therefore, the position of the heating source may be measured while the head 100 is correspondingly moved to the left or to the right.

In a case in which the in-operation cooktop information is not received (S731), as described above, the measuring of the relative position of the portable air flow apparatus 10 may be performed (S736). Then, when the relative position of the portable air flow apparatus 10 is measured, the measuring of the position of the heating source may be performed (S737).

At this point, in the measuring of the position of the heating source (S737), by measuring the relative position, a state is also attained in which the position of the cooking heating equipment 30 is measured. Therefore, the position of the heating source is measured by rotating the head 100 to the left or to the right.

With reference back to FIG. 34, in a case in which the conjunctional-operation detection mode is not in execution (S72), for example, in a case in which the relative position of the portable air flow apparatus 10 is not measured, the head 100 measures the position of the heating source while rotated to the left or to the right in the horizontal direction (S74). Accordingly, although the portable air flow apparatus 10 is arranged to the left of the cooking heating equipment 30 or to the right thereof, the position of the heating source may be determined precisely.

Through the operations described above, when the position of the heating source is measured, the angle in the horizontal direction of the head 100 may be adjusted in such a manner that the suction inlet 110 of the head 100 is positioned over the heating source or most adjacent to the heating source (S75). At this point, for example, the controller 540 may drive the horizontal angle adjustment unit 521 to adjust the angle in the horizontal direction of the head 100.

The angle in the horizontal direction of the head 100 may be adjusted, and then adjusting of the height of the head 100 may be performed. For example, in a case in which the distance sensor 612 is mounted on a lower surface of the head 100, in order to increase precision of measurement of the height of the cooking utensil 31, it is desirable that a distance to the cooking utensil 31 is measured in a state in which the head 100 is positioned over the cooking utensil 31.

As described above, in initializing of the positioning (Step S71), the head 100 ascends to the maximum height, and the angle in the horizontal direction thereof is adjusted. Therefore, the head 100 is in a state of ascending to the maximum height in the measuring of the height of the cooking utensil 31 (Step S76).

In this manner, when the height of the cooking utensil 31 is measured, the height of the head 100 may be adjusted (S77). The height of the head 100 may be adjusted on the basis of the height of the cooking utensil 31 in such a manner that the head 100 is spaced by a preset or predetermined optimal distance in an upward direction away from the cooking utensil 31.

Figure 37:
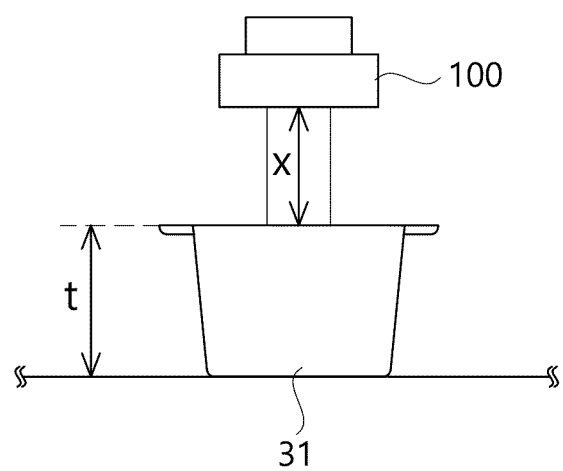
FIG. 37 is a view for describing how to adjust a height of the head in the method for controlling the portable air flow apparatus according to an embodiment.

With reference to FIG. 37, the height of the cooking utensil 31 measured in the measuring of the height may be defined as t and the optimal distance may be defined as x. As described above, the minimum height of the head 100 is $h_{min}$, and the maximum height thereof is $h_{max}$.

In a case in which the height of the detected cooking utensil 31 is greater than the maximum height minus the optimal distance, the height of the head 100 may be adjusted to the maximum height. In addition, in a case in which the height of the detected cooking utensil 31 is equal to or smaller than the maximum height minus the optimal distance, the height of the head 100 may be adjusted to the minimum height. In other cases, as described above, the height of head 100 may be adjusted in such a manner that a distance between the head 100 and the cooking utensil 31 is the optimal distance.

This relationship among the height of the cooking utensil 31, the optimal distance, the maximum height, and the minimum height may be expressed in Equation 1.

$$h = h_{min}, \quad \text{if } t \le h_{min} - x \qquad \qquad \text{Equation 1}$$
$$h = t + x, \quad \text{if } h_{min} - x < t \le h_{max} - x$$
$$h = h_{max}, \quad \text{if } h_{max} - x < t$$

With the configuration as described above, the height of the head 100 may be maintained at a height which is optimal for suctioning the oil mist. The height of the head 100 may be adjusted to the minimum height or the maximum height according to the height of the cooking utensil 31.

When the angle in the horizontal direction of the head 100 and the height of the head 100 are completely adjusted as described above, the hood controller 540 may rotate the fan motor 530. Thus, the oil mist may be suctioned through the suction inlet 110 and then discharged through the discharge outlet 120. Consequently, the oil mist produced during cooking may be removed.

Figure 38:
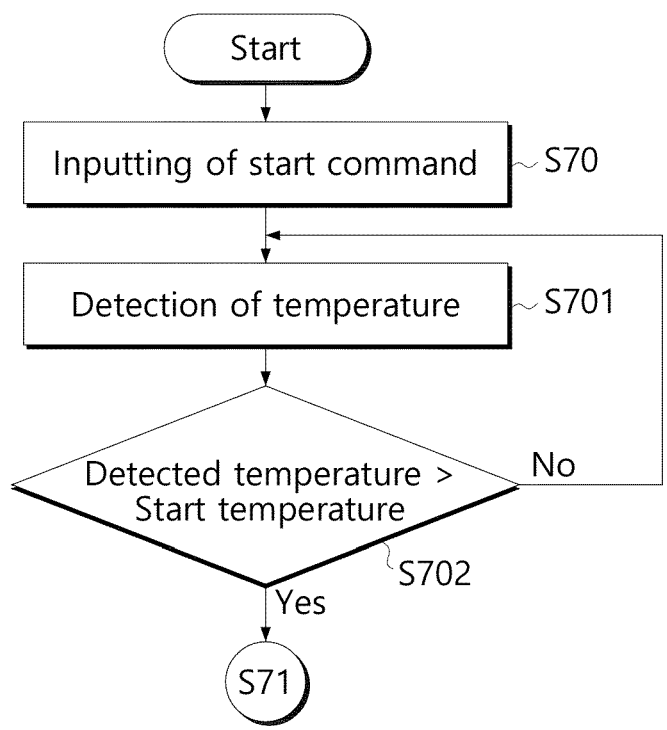
FIG. 38 is a flowchart of a method for controlling a portable air flow apparatus according to yet another embodiment.

FIG. 38 is a flowchart for controlling a portable air flow apparatus according to another embodiment. The method illustrated in FIG. 38 for controlling the portable air flow apparatus according to this embodiment may be configured to further include a step or operation of measuring a temperature. More specifically, for example, as described above, when the start command is input (S70), measuring of the temperature may be first performed (S701).

In the measuring the temperature according to this embodiment, a temperature of the cooking utensil 31 side may be measured. Then, for example, in a case in which the temperature of the cooking utensil 31 side exceeds a preset or predetermined start temperature (S702), a step or operation subsequent to the initializing of the positioning may be performed (step S71).

When a temperature of food being cooked rises to a predetermined temperature or higher, oil mist may occur after cooking. For this reason, although cooking starts and the start command is input, according to this embodiment, the portable air flow apparatus 10 is enabled to operate when a temperature of the food being cooked rises to a start temperature or higher. Thus, unnecessary operation of the portable air flow apparatus 10 may be prevented.

In addition, usually, a user adds cooking ingredients or a condiment, for example, into the cooking utensil 31 early in the cooking process. The portable air flow apparatus 10 is not enabled to operate early in the cooking process in order not to interfere with the addition of the cooking ingredients or the condiment, for example. Thus, user convenience may be achieved.

Figure 34:
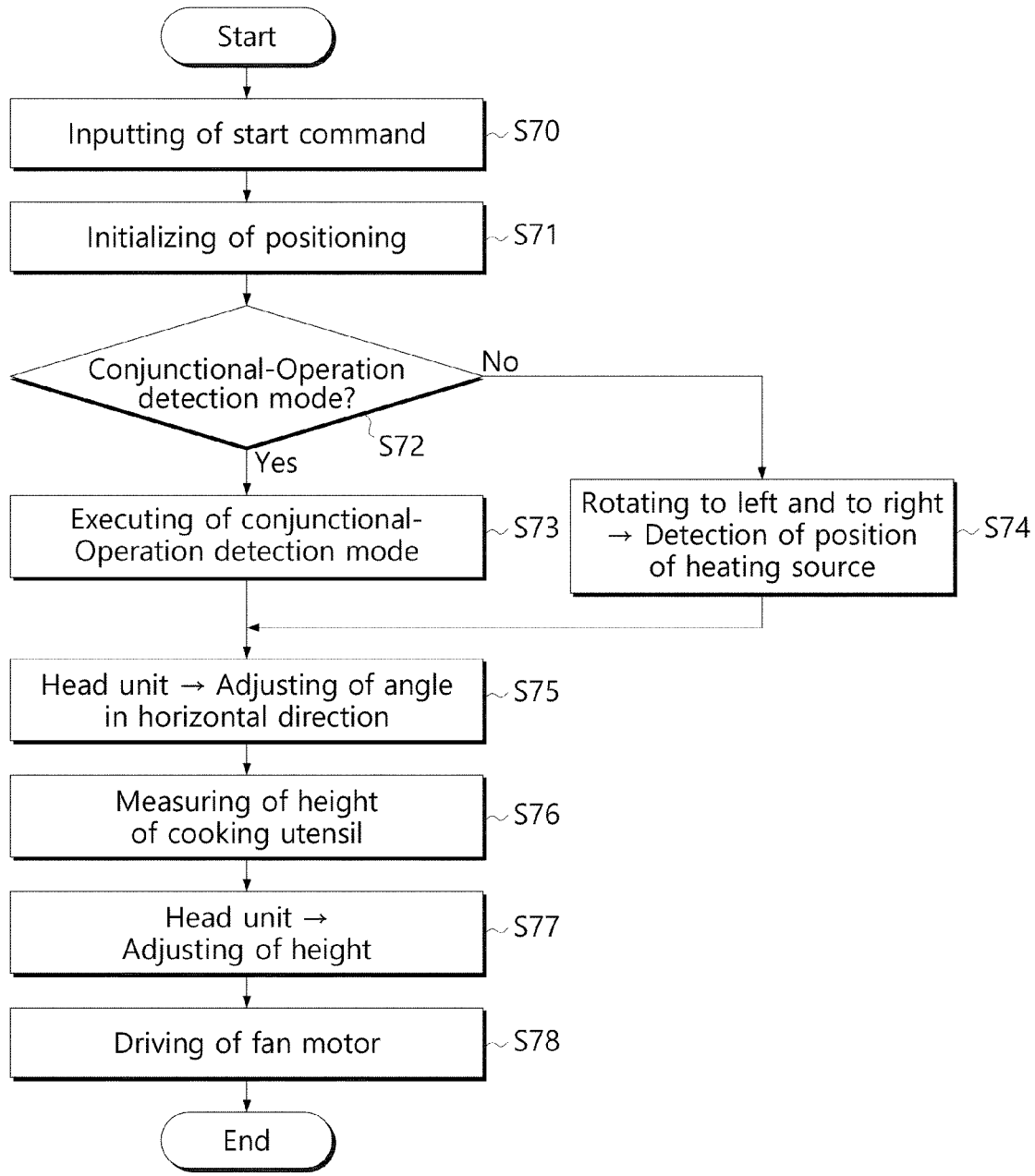
FIG. 34 is a flowchart of a method for controlling a portable air flow apparatus according to an embodiment.

Steps or operations subsequent to S702 in FIG. 38 may be the same as those illustrated in FIG. 34, and thus, repetitive description thereof has been omitted.

Figure 39:
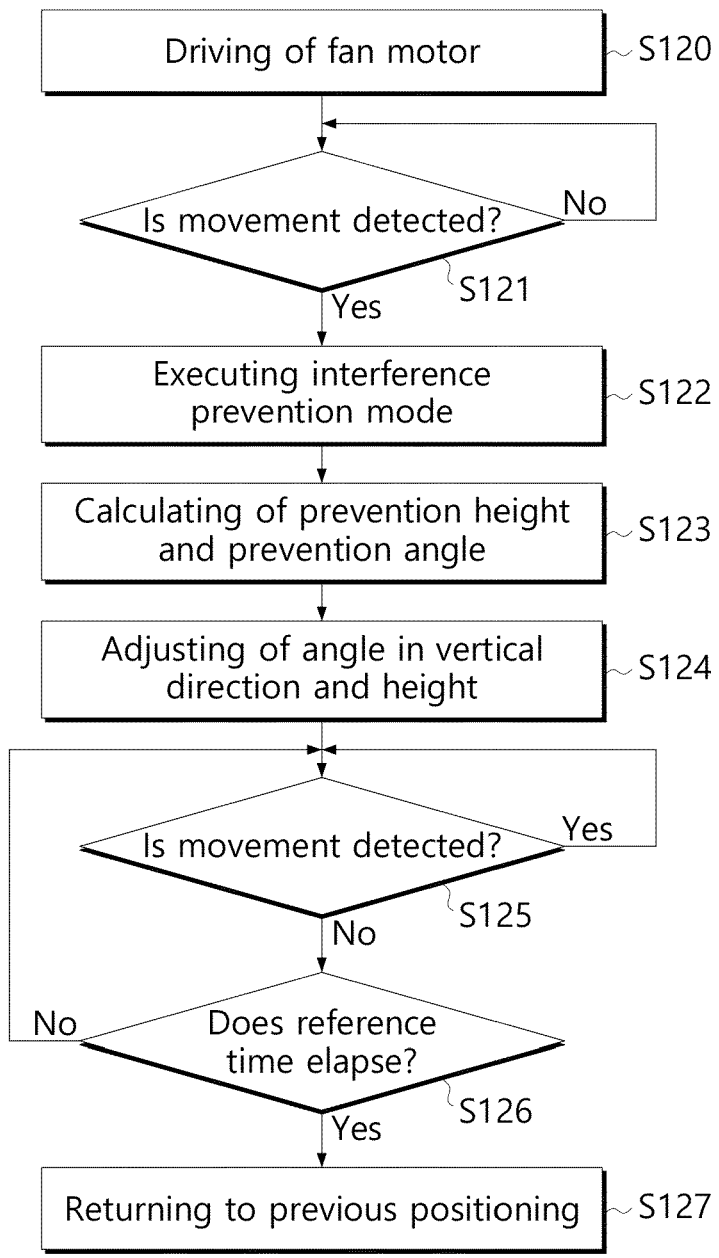
FIG. 39 is a flowchart of a method for controlling a portable air flow apparatus through an interference prevention mode according to the embodiment.

The method for controlling the portable air flow apparatus 10 according to this embodiment may be performed in an interference prevention mode. FIG. 39 is a flowchart of a method for controlling a portable air flow apparatus through an interference prevention mode.

More specifically, with reference to FIG. 39, in the method for controlling a portable air flow apparatus 10 according to this embodiment, movement in a direction of cooking utensil 31 may be detected (S121) in a state in which fan motor 530 is driven (S120). The movement sensor 613 may detect the movement in the direction of the cooking utensil 31 as described above.

For example, when, during cooking, a user performs an operation, such as opening a cover of the cooking utensil 31 to add new cooking ingredients or a condiment into the cooking utensil 31 or to taste food to see how it is seasoned, the movement sensor 613 may detect this operation. When the operation is detected, the interference prevention mode may be executed (S122). Thus, positioning of the head 100 may be adjusted in the preset or predetermined interference prevention mode.

In the interference prevention mode, the height of the head 100 may be adjusted, or the head 100 may be rotated in the vertical direction, thereby adjusting the angle thereof to a predetermined angle. Alternatively, the height of the head 100 and the angle in the vertical direction of the head 100 may both be adjusted.

For example, in a step or operation of making an adjustment in the interference prevention mode, at least one of the height of the head 100 or the angle in the vertical direction of the head 100 may be adjusted such that the distance between the head 100 and the cooking utensil 31 is secured as a preset or predetermined interference prevention distance. In the method for controlling the portable air flow apparatus 10 according to this embodiment, for example, an interference prevention height and an interference prevention angle for operation in the inference prevention mode may be calculated (S123), as illustrated in FIG. 39 (S123).

Figure 40:
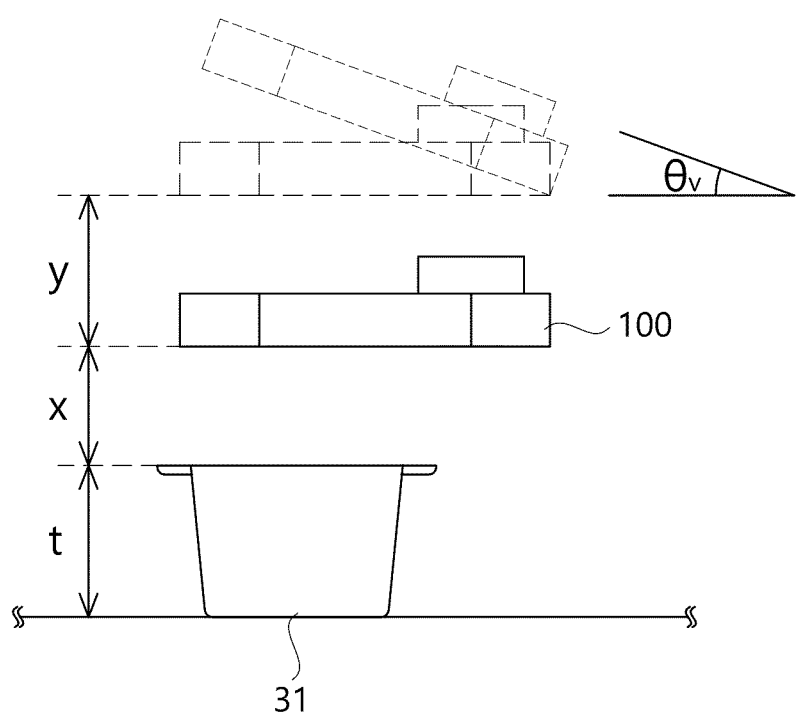
FIG. 40 is a view for describing how to execute an interference prevention mode illustrated in FIG. 39.

FIG. 40 is a view for describing how to execute an interference prevention mode in a method for controlling a portable air flow apparatus according to an embodiment. With reference to FIG. 40, as described above, t is the height of the cooking utensil 31, and x is the optimal distance, which is a current distance between the head 100 and the cooking utensil 31. Further, $h_{min}$ is the minimum height, and $h_{max}$ is the maximum height. y is the interference prevention distance that needs to be secured in order not to interfere with the user's movement.

In a case in which there is room for the head 100 to ascend by the interference prevention distance from a current height thereof, the head 100 may be enabled to ascend by the interference prevention distance from the current height thereof. A condition for this ascending of the head 100 from the current height thereof may be expressed in Equation 2.

$$t+x \leq h_{max}-y \qquad \text{Equation 2}$$

In contrast, in a case in which a current distance between the head 100 and the cooking utensil 31 is smaller than the optimal distance, that is, in a state in which the head 100 is currently at the maximum height, the angle in the vertical direction of the head 100 may be adjusted. A condition for this adjustment of the angle in the vertical direction of the head 100 may be expressed in Equation 3.

$$t+x > h_{max} \qquad \text{Equation 3}$$

When the condition expressed in Equation 3 is satisfied, the angle θv in the vertical direction of the head 100 may be adjusted as in Equation 4.

$$\theta_v = \sin^{-1} \frac{y}{l} \qquad \text{Equation 4}$$

where l is a length of the head 100.

In equation 4, for example, the angle in the vertical direction of the head 100 is adjusted according to the length of the head 100 and the interference prevention distance.

In a condition other than that as described above, for example, the height of the head 100 and the angle in the vertical direction of the head 100 are both adjusted. A condition for this adjustment of the angle in the vertical direction of the head 100 may be expressed in Equation 5.

$$h_{max}-y < t+x \leq h_{max} \qquad \text{Equation 5}$$

In a case in which the condition expressed in Equation 5 is satisfied, the head 100 may be enabled to ascend to the maximum height. Then, the angle in the vertical direction of the head 100 may be adjusted as in Equation 6.

$$\theta_v = \sin^{-1} \frac{(t+x+y-h_{max})}{l} \qquad \text{Equation 6}$$

As described above, when at least one of the interference prevention height or the interference prevention angle is determined, the height of the head 100 and the angle in the vertical direction of the head 100 may be adjusted (S124).

In the method for controlling the portable air flow apparatus according to this embodiment, for example, the interference prevention height and the interference prevention angle is possibly adjusted in other ways in order to prevent interference with the movement. For example, the head 100 may be rotated by an angle 90° in the vertical direction, and thus, the head 100 may be in an upright position in the vertical direction. As another example, the head 100 may be enabled to ascend to the maximum height, and the angle in the vertical direction of the head 100 may be set to a preset or predetermined angle, for example, 45°.

After the height and the angle of the head 100, as described above, are adjusted in the interference prevention mode, in a case in which movement is not detected for a preset or predetermined reference time (S125 and S126), the positioning of the head 100 may be adjusted (S127) such that the head 100 returns to previous positioning thereof established before the interference prevention mode is executed (S127).

In the above-described example, after the start command is executed, the height of the head 100 and the angle in the horizontal direction of the head 100 are adjusted, as illustrated in FIG. 34. As another example, according to the height of the cooking utensil 31 measured (S76), the angle in the vertical direction of the head 100, along with the height of the head 100, may be adjusted.

In the adjusting of the angle or the height of the head 100, in a case in which a preset or predetermined condition for vertical-angle adjustment is satisfied, the angle in the vertical direction of the head 100 may be adjusted on the basis of the height of the cooking utensil 31. For example, if the height of the cooking utensil 31 is so high that the optimal distance is not secured although the head 100 is enabled to ascend to the maximum height, this case is also determined as satisfying the condition for vertical-angle adjustment. Thus, of course, the angle in the horizontal direction of the head 100 may be adjusted.

Embodiments disclosed herein provide a portable air flow apparatus that is not limited in installation position. Embodiments disclosed herein provide a portable air flow apparatus capable of suctioning oil mist produced from a cooking utensil, such as a pot, during food cooking, when employed as a portable hood. The portable air flow apparatus may be positioned vertically adjacent to the cooking utensil and increases efficiency of suctioning the oil mist.

Embodiments disclosed herein provide a portable air flow apparatus capable of adjusting a position of a suction inlet thereof according to a height or position of a cooking utensil in such a manner that the suction inlet is positioned above the cooking utensil, when employed as a portable hood. Embodiments disclosed herein also provide a portable air flow apparatus capable of being stably seated without the risk of falling down during cooking. Embodiments disclosed herein provide a portable air flow apparatus capable of preventing a bypass phenomenon where air, and oil mist, for example bypass a suction inlet thereof without being introduced into the suction inlet.

Embodiments disclosed herein additionally provide a portable air flow apparatus capable of suctioning oil mist through a suction inlet thereof, discharging the oil mist upward, and thus, being suctioned into a fixed-type hood installed in a kitchen, when employed as a portable hood. The portable air flow apparatus may effectively remove the oil mist in cooperation with the fixed-type hood.

Embodiments disclosed herein provide a portable air flow apparatus capable of being disassembled into primary components for cleaning, and replacement, for example.

Embodiments disclosed herein further provide a portable air flow apparatus capable of also functioning as an air purifier in addition to removing oil mist during cooking.

Embodiments disclosed herein provide a method for controlling a portable air flow apparatus capable of automatically adjusting a position of a head having a suction inlet, and thus, improving efficiency of suctioning of oil mist. Embodiments disclosed herein further provide a method for controlling a portable air flow apparatus capable of automatically adjusting a position in a horizontal direction of a head according to a position of a heating source.

Embodiments disclosed herein furthermore provide a method for controlling a portable air flow apparatus capable of automatically adjusting a height of a head according to a height of a cooking utensil, such as a pot.

Embodiments disclosed herein provide a method for controlling a portable air flow apparatus capable of automatically adjusting a position in a vertical direction of a head according to a usage condition. Embodiments disclosed herein also provide a method for controlling a portable air flow apparatus capable of preventing collision with a cooking utensil while automatically adjusting a position of a head.

Embodiments disclosed herein provide a method for controlling a portable air flow apparatus capable of automatically adjust a position of a head through operation in conjunction with cooking heating equipment or a fixed-type hood. Embodiments disclosed herein additionally provide a method for controlling a portable air flow guiding apparatus capable of minimizing interference with a user's movement involved in cooking food, among movements.

Embodiments disclosed herein provide a portable air flow apparatus that may include a base unit or base, a head unit or head, and a columnar unit or column. The base unit may be configured seated on a surface.

The head unit may be configured to include a suction inlet through which air is suctioned and a discharge outlet through which the air suctioned through the suction inlet is discharged. The suction inlet and the discharge outlet may be horizontally spaced apart from each other at a right angle with respect to a vertical direction.

The column may connect the head and the base in such a manner that the head is vertically spaced from the base. The columnar unit may be coupled with the head in such a manner that it is spaced away from the suction inlet in a direction of the discharge outlet. The column may be rotatably coupled with the base unit in such a manner that the suction inlet side of the head is rotated in a leftward-rightward or lateral direction.

The suction inlet may be open at a bottom, and through the suction inlet, the air may be suctioned from below. The discharge outlet may be open at a top, and through the discharge, the air may be discharged upward. The suction inlet and the discharge outlet may be formed in the head in such a manner that edge portions facing each other of the suction inlet and the discharge outlet do not overlap in the vertical direction.

The portable air flow apparatus may further include a discharge fan and a fan motor. The discharge fan may be mounted inside of the discharge outlet and may generate a suction force for suctioning the air through the suction inlet and discharging the suctioned air through the discharge outlet. A fan motor may be mounted underneath the discharge fan and may rotate the discharge fan. The discharge fan may include a mixed flow fan.

The head may include a head main body and a flow path unit or flow path. In the head unit, the suction inlet and the discharge outlet may be horizontally spaced apart from each other. The flow path unit, along which the air suctioned through the suction inlet may flow toward the discharge outlet, may be provided inside of the head main body.

The discharge outlet may be formed in such a manner as to have a greater cross-sectional area than the flow path unit. The discharge fan may be mounted over the flow path unit, and the fan motor may be mounted underneath the flow path unit.

The flow path unit may include a inlet, an outlet, and an inner flow path. The inlet may be open at a bottom such that it faces toward the suction inlet, and the outlet may be open at a top in such a manner that it faces toward the discharge outlet. Through the inner flow path, the inlet and the outlet horizontally may communicate with each other. The discharge fan and the fan motor may be mounted in the head main body in such a manner as to be positioned over and underneath, respectively, the outlet.

The discharge fan and the fan motor may be positioned over the column, and thus, a center of gravity of the portable air flow apparatus may be positioned in the column. The flow path unit may be formed by machining an inside of the head main body. The flow path unit may be formed by mounting a cylindrical member, in which the inlet, the outlet, and the inner flow path are formed, inside of the head main body.

An edge portion of an inner wall surface of the inner flow path, at which a direction of flow of the air is changed, may have a rounded shape.

The discharge outlet may include a fan housing and a discharge grill. The fan housing, inside of which the discharge fan may be accommodated, may protrude upward from an upper plate-like surface of the head main body and may be open at a top and bottom. The discharge grill may be detachably coupled with an upper opening in the fan housing and may cover the upper opening in the fan housing. The fan housing may be detachably coupled with the head main body.

The fan motor may include a fan shaft that extends toward the discharge fan and transfers a rotational force of the fan motor to the discharge fan. A screw thread may be formed on an outer circumferential surface of an end portion of the fan shaft.

The discharge fan may include a shaft through-hole and a fan nut. The shaft through-hole may pass therethrough from top to bottom in such a manner that the end portion of the fan shaft passing through the shaft through-hole is exposed to the outside in such a manner that it is positioned over the discharge fan. The end portion of the fan shaft, passing through the shaft through-hole, may be inserted into the fan nut for being fastened thereto, and thus, the discharge fan may be fixed to the fan shaft.

The discharge fan may further include a fan blocking portion formed in a lower surface thereof. The fan shaft may include a shaft blocking protrusion that radially protrudes outward from an outer circumferential surface of the fan shaft. Movement of the shaft blocking protrusion may be blocked by the fan blocking portion when the fan shaft passes through the shaft through-hole, and thus, the shaft blocking protrusion may rotate the discharge fan by rotation of the fan shaft.

The portable air flow apparatus may further include a filter unit. The filter unit may be mounted in the suction inlet and may purify air suctioned through the suction inlet. A purification filer may include at least one of a deodorizing filter or an oil mist filter.

The head main body may include a casing main body, an upper casing, and a lower casing. A flow path space in which the suction inlet and the flow path unit are seated may be formed in the casing main body. The upper casing may be coupled with the casing main body in a direction of moving downward from over the casing main body. The discharge outlet may be formed in the upper casing.

A through-hole may be formed, at a position corresponding to the suction inlet, in the lower casing in such a manner that it passes therethrough from top to bottom. The lower casing may be coupled with the casing main body in a direction of moving up from under the casing main body. The purification filter may include a free filter mounted in the through-hole in the lower casing.

The upper casing may be coupled with the casing main body in such a manner as to surround a lateral surface of the casing main body.

The portable air flow apparatus may further a filter roll and a filter transportation unit. The filter roller may be rotatably mounted in the casing main body, with the oil mist filer being wound thereon.

The filter transportation unit may be mounted in the casing main body in such a manner as to be positioned in front of the filter roll with the suction inlet therein between. The filter transportation unit may discharge the oil mist filter horizontally extending from the filter roll and passing the suction inlet, to the outside of the casing main body.

A filter discharge hole through which the mist oil filter transported by the filter transportation unit passes may be formed in the upper casing in such a manner that it passes therethrough from top to bottom. The oil mist filter that passes the suction inlet and is connected to the filter transportation unit in a state of being inclined upward may be transported upward by the filter transportation unit.

The portable air flow apparatus may further include a rotation unit that connects the columnar unit and the base unit in such a manner that the columnar unit is rotated with respect to the base unit. The rotation unit may include a first rotation member and a second rotation member. The first rotation member may be mounted underneath the columnar unit. The second rotation member may be mounted in the base unit and may rotatably support the first rotation member in such a manner that the columnar unit is rotated. The first rotation member may have the shape of a circular plate, and the second rotation member may have the shape of a circular ring so as to be rotatably supported along an inner circumferential surface of the first rotation member.

A blocking protrusion may be provided on an outer circumferential surface of the first rotation member such that it is radially protrudes outward therefrom. A plurality of blocking grooves may be formed in an inner circumferential surface of the second rotation member in such a manner as to be spaced apart by a preset or predetermined angle, and the blocking protrusion may be inserted into the blocking groove and movement of the blocking protrusion may thus be blocked by the blocking groove.

Three blocking grooves may be formed spaced apart by an angle of 90°. The base unit and the head unit may be positioned in such a manner as to be aligned with each other and so that the head unit is rotated by an angle of 90° to the left or to the right with respect to the base unit.

The rotation unit may include a rotation control unit. The rotation control unit may control rotation of the first rotation member in such a manner that the head unit is rotated by up to a preset or predetermined angle to the left or the right from a position at which the head unit is aligned with the base unit.

The columnar unit may include a first columnar member or column, a second columnar member or column, and a height adjustment unit. The first columnar member may have the shape of a cylinder and a first side thereof may be coupled with the head unit. The second columnar member may have the shape of a cylinder and a first side thereof may be coupled with the base unit. A second side of the second columnar member may be inserted into a second side of the first columnar member.

The height adjustment unit may enable the first columnar member to ascend or descend with respect to the second columnar member in such a manner that a height of the head unit is adjusted. The height adjustment unit may include a rack member or rack, a pinion member or pinion, and a damper. The rack member may be mounted on one of the first columnar member and the second columnar member or may be formed along an upward-downward or vertical direction. The pinion member may be rotated by being engaged with the rack member.

The damper may be mounted on the other one of the first columnar member or the second columnar. The damper may be connected to a rotational shaft of the pinion member, and thus, the damper may enable the first columnar member to ascend when the pinion member is rotated by being engaged with the rack member. The damper may exert a load in such a manner that a position to which the first columnar member ascends is maintained.

The fan motor may be mounted inside of the discharge fan. The discharge fan accommodated inside of the fan motor may be mounted inside of the fan housing.

The discharge unit may further include a shaft connection member that connects a rotational shaft of the discharge fan and the discharge grill in such a manner that the discharge fan is rotatable inside of the fan housing. When the discharge grill is removed from the fan housing, the discharge fan and the fan motor may be removed together by the shaft connection member.

The portable air flow apparatus may further include a first connector and a second connector. The first connector may be mounted on the discharge grill and may be electrically connected to the fan motor. The second connector may be mounted, at a position corresponding to the first connector, in the fan housing. The first connector and the second connector may be connected to each other when the discharge grill is mounted in the fan housing, thereby supplying electric power to the fan motor.

The discharge unit may further include a blocking jaw, a blocking lever, and an elastic member. The blocking jaw may be mounted on the discharge grill and may be inserted into the fan housing when the discharge grill is mounted in the fan housing. The blocking lever may be mounted in the fan housing in such a manner that movement of the blocking lever is blocked by and released from the blocking jaw. The elastic member may press the blocking lever in a direction in which movement of the blocking lever is blocked by the blocking jaw, and thus, may maintain a state in which the movement of the blocking lever is blocked by the blocking jaw.

The head unit may be coupled with the columnar unit in such a manner that an angle at which the head unit is inclined in an upward-downward or vertical direction with respect to the columnar unit is adjustable.

The discharge unit may be formed to have a greater cross-sectional area than the flow path unit.

The purification filter may include a HEPA filter and a deodorizing filter, and thus, may be capable of performing an air purification function.

Embodiments disclosed herein provide a method for controlling a portable air flow apparatus. The method may include measuring a position of a heating source. The method may include measuring a height of a cooking utensil. The method may include adjusting at least one of an angle in a horizontal direction of a head unit or head including a suction inlet or a height of the head unit according to the position of the heating source and the height of the cooking utensil.

The adjusting of the at least one of the angle in the horizontal direction of the head unit or the height of the head unit may include adjusting an angle in a vertical direction of the head unit according to the height of the cooking utensil.

The method may further include inputting a start command for the portable air flow apparatus, and adjusting positioning of the head unit to an initial positioning according to the start command. The measuring of the position of the heating source, the measuring of the height of the cooking utensil, and the adjusting of the at least one of the angle in the horizontal direction of the head unit or the height of the head unit may be performed subsequently to the adjusting of the positioning of the head unit.

In the inputting of the start command, the start command may be input by operating an operation button of the portable air flow apparatus. In the inputting of the start command, the start command may be input from outside of the portable air flow apparatus.

In the adjusting of the positioning of the head unit, the height of the head unit may be adjusted to a maximum height. The measuring of the position of the heating source may include at least one of the following: measuring a temperature of cooking heating equipment, and thus, measuring the position of the heating source, or measuring the position of the heating source through operation in conjunction with the cooking heating equipment.

In the measuring of the temperature of the cooking heating equipment, the angle in the horizontal direction of the head unit may be adjusted in a leftward-rightward or lateral direction, and thus, the temperature of the cooking heating equipment may be measured. In the measuring of the position of the heating source through the operation in conjunction with the cooking heating equipment, a relative position of the portable air flow apparatus with respect to the cooking heating equipment may be measured.

In the measuring of the position of the heating source through the operation in conjunction with the cooking heating equipment, the head unit may be rotated to the left or to the right in the horizontal direction on the basis of the relative position of the portable air flow apparatus. In the method, in the measuring of the position of the heating source through the operation in conjunction with the cooking heating equipment, the temperature of the cooking heating equipment in conjunction may be measured while the head unit is rotated to the left or to the right, and thus, the position of the heating source may be measured.

In the measuring of the position of the heating source through the operation in conjunction with the cooking heating equipment, in-operation cooktop information on a cooktop that is turned on may be received from the cooking heating equipment with which the portable air flow apparatus operates in conjunction. In the measuring of the position of the heating source through the operation in conjunction with the cooking heating equipment, the heating source may be detected on the basis of the in-operation cooktop information.

The adjusting of the at least one of the angle in the horizontal direction of the head unit or the height of the head unit may include at least one of the following: adjusting the angle in the horizontal direction on the basis of the position of the heating source; adjusting the height of the head unit on the basis of the height of the cooking utensil; or adjusting the angle in the vertical angle of the head unit in a case in which a preset or predetermined condition for vertical-angle adjustment is satisfied, on the basis of the height of the cooking utensil. The adjusting of the angle in the horizontal direction may be performed earlier than the adjusting of the height of the head unit and the adjusting of the angle in the vertical angle.

In the adjusting of the height of the head unit, the height of the head unit may be adjusted on the basis of the height of the cooking utensil in such a manner that the head unit is vertically spaced by a preset or predetermined optimal distance away from the cooking utensil. The adjusting of the height of the head unit may include adjusting the height of the head unit to a maximum height in a case in which the height of the cooking utensil is greater than the maximum height minus the preset optimal distance. The adjusting of the height of the head unit may include adjusting the height of the head unit to a minimum height in a case in which the height of the cooking utensil is equal to or smaller than the maximum height minus the optimal distance. The preset condition for vertical-angle adjustment may include a condition that a distance between the head unit and the cooking utensil is smaller at the maximum height of the head unit than the optimal distance.

The method may include detecting movement in a direction of the cooking utensil among movements of the portable air flow apparatus. The method may include adjusting the positioning of the head unit in a preset or predetermined interference prevention mode in a case in which movement is detected.

The adjusting of the positioning of the head unit in the preset interference prevention mode may include at least one of the following: adjusting the height of the head unit to a preset or predetermined interference prevention height, or rotating the head unit in the vertical direction, and thus, adjusting an angle of the head unit to a preset or predetermined angle.

In the adjusting of the positioning of the head unit in the preset interference prevention mode, at least one of the height of the head unit or the angle in the vertical direction of the head unit may be adjusted in such a manner that a distance between the head unit and the cooking utensil is the same as a preset or predetermined interference prevention distance.

The method may further include adjusting the positioning of the head unit to previous positioning thereof established before the interference prevention mode is executed, in a case in which the movement is not detected for a preset or predetermined reference time after the interference prevention mode is executed.

The method may further include detecting a temperature of the cooking utensil side after the start command is input. The measuring of the position of the heating source, the measuring of the height of the cooking utensil, and the adjusting of the at least one of the angle in the horizontal direction of the head unit or the height of the head unit may be performed subsequently to the adjusting of the positioning of the head unit, in a case in which the temperature of the cooking utensil side exceeds a preset or predetermined start temperature.

A portable air flow apparatus according to embodiments disclosed herein has at least the following advantages.

First, the suction inlet and the discharge outlet are formed in such a manner as to be horizontally spaced apart from each other. Accordingly, a phenomenon that occurs when the suction inlet and the discharge outlet are coaxially positioned in the vertical direction may be prevented. Thus, the effect of improving efficiency of suctioning and discharging air may be achieved.

Second, the suction inlet and the discharge outlet are formed in such a manner as to be horizontally spaced apart from each other. Accordingly, a flow of air suctioned toward the suctioning unit and a flow of air discharged toward the discharge outlet do not interfere with each other. Thus, the effect of improving efficiency of suctioning and discharging air may be achieved.

Third, the head unit is provided in such a manner as to be rotatable to the left and the right with respect to the base unit. When the portable air flow apparatus is used as a portable hood, a height of the head unit may be adjusted in such a manner that the suction inlet is positioned vertically adjacent to a cooking utensil according to a cooking environment, such as a position of a cooktop in use. Accordingly, oil mist may be suctioned at a position that is vertically adjacent to the cooking utensil. Thus, the effect of effectively improving efficiency of suctioning and discharging air may be achieved.

Fourth, the discharge outlet has a structure in which oil mist is discharged upward. Accordingly, when the portable air flow apparatus is used as a portable hood, the oil mist is discharged toward a fixed-type hood. Thus, the effect of effectively removing the oil mist occurring during cooking in cooperation with the fixed-type hood may be achieved.

Fifth, the discharge fan and the fan motor are mounted over the column. Accordingly, a center of gravity of the portable air flow apparatus is positioned in the colum side of the head in which the discharge is formed. Although the suctioning unit of the head is rotated to the left or to the right, the effect of preventing the portable air-flow apparatus from falling down may be achieved because the center of gravity is positioned in the column side.

Sixth, the fan motor that rotates the discharge fan is positioned below a flow path along which the oil mist flows. Thus, the effect of preventing contamination of the fan motor with air or oil mist may be achieved. In addition, when disassembling the portable air flow apparatus for cleaning the fan motor, there is no need to disassemble the fan motor. Thus, the effect of simplifying the process of disassembly and cleaning may be achieved.

Seventh, the head main body is separated into the casing main body and the upper casing, and the flow path through which the suction inlet and the discharge outlet communicate with each other is separated from the casing main body. Thus, the effect in which the flow path along which air or oil mist flow is separable for cleaning may be achieved.

Eighth, the fan housing that accommodates the discharge fan protrudes from the head unit. Thus, the effect in which the head main body accommodating the discharge fan and the fan motor is formed slimly in the vertical direction so that an entire thickness thereof is small may be achieved.

Ninth, the head is easily disassembled. Thus, the effect in which the discharge fan, the flow path, the purification filter, such as the deodorizing filter, which are mounted in the head may be easily cleaned or replaced may be achieved.

Tenth, the first casing main body and the second casing main body are coupled with each other by a hinge mechanism. Thus, the effect of easily replacing the oil mist filter in the shape of a roll filter after separating the lower casing from the casing main body may be achieved.

Eleventh, a configuration is employed in which, when the portable air flow apparatus is used as a portable hood, the end portion of the oil mist filter to be discharged to over the head is discharged in a direction of the discharge outlet which is opposite to a direction of the cooktop. The effect of preventing a fire accident that may occur when the end portion of the oil mist filter is discharged toward the cooktop may be achieved.

Twelfth, the head is provided in such a manner that a height thereof is adjustable. The effect in which, when the portable air flow apparatus is used as a portable hood, oil mist produced from cooking utensils of various heights are effectively suctioned and discharged without influencing cooking may be achieved.

Thirteenth, components, such a weight plate and a battery module, may be arranged in the base or the column side, and thus, the center of gravity may be positioned in the column side or the base side, thereby ensuring an upright position of the portable air flow apparatus. Thus, the effect of preventing the portable air flow apparatus from falling down may be achieved.

Fourteenth, the structure in which the purification filter constituting the filter unit may be replaced is employed. Accordingly, instead of the purification filter dedicated for cooking, a purification filter for air cleaning may be used. Thus, the effect of using the portable air flow apparatus as an air purifier may be achieved.

Fifteenth, when the portable air flow apparatus is employed as a hood with directivity, a position of the suction inlet formed in the head is automatically adjusted, and thus, the suction inlet may be positioned over the cooking utensil. Thus, the effect of improving efficiency of suctioning the oil mist may be achieved.

Sixteenth, when the portable air flow apparatus is employed as a hood with directivity, a position of a heating source is detected, and thus, a position in a horizontal direction of the head may be automatically adjusted, and thus, the suction inlet is positioned over the heating source. Thus, the effect of improving efficiency of suctioning the oil mist may be achieved.

Seventeenth, when the portable air flow apparatus is employed as a hood with directivity, a distance to the cooking utensil is measured, and thus, the height of the head is automatically adjusted to an optimal height according to the distance to the cooking utensil. Thus, the effect of improving efficiency of suctioning the oil mist may be achieved.

Eighteenth, when the portable air flow apparatus is employed as a hood with directivity, in a case in which a height of the cooking utensil is relatively great, an angle in the vertical direction of the head is also automatically adjusted. Thus, the effect of adjusting a position of the suction inlet to an optimal position may be achieved.

Nineteenth, when the portable air flow apparatus is employed as a hood with directivity, although the portable air flow apparatus is not separately operated, the portable air flow apparatus is automatically operated through operation in conjunction with the fixed-type hood. Thus, the effect of improving user convenience may be achieved.

Twentieth, when the portable air flow apparatus is employed as a hood with directivity, while the portable air flow apparatus is in operation, a user's movement is also detected, and thus, positioning of the head is adjusted. Thus, the effect of minimizing interference with a user's movement involved in cooking food may be achieved.

Embodiments are described above with reference to the accompanying drawings; however, the embodiments are not limited to the described embodiments. It would be understandable to a person of ordinary skill in the art to which the embodiments pertain that the embodiments can also be practiced in various forms without any modification to the technical idea and the essential feature thereof. Therefore, in every aspect, the embodiments described above should be understood as being exemplary and non-restrictive.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable air flow apparatus, comprising:
   a base configured to be seated on a surface;
   a head comprising a suction inlet through which air is suctioned into the head and a discharge outlet through which the air suctioned in through the suction inlet is discharged, the suction inlet and the discharge outlet being horizontally spaced apart from each other; and
   a column that connects the head and the base in such a manner that the head is vertically spaced from the base, wherein the column is coupled with the head such that the column is spaced apart from the suction inlet in a direction of the discharge outlet and is rotatably coupled with the base such that a suction inlet side of the head is rotatable in a leftward-rightward direction, and wherein the discharge outlet is positioned over the column, such that the discharge outlet is not rotated around the column when the column is rotated.

2. The portable air flow apparatus of claim 1, wherein the suction inlet is open at a bottom of the head, and through the suction inlet, the air is suctioned from below, and the discharge outlet is open at a top of the head, and through the discharge outlet, the air is discharged upward.

3. The portable air flow apparatus of claim 2, wherein the suction inlet and the discharge outlet are formed in the head such that edge portions facing each other of the suction inlet and the discharge outlet do not overlap in the vertical direction.

4. The portable air flow apparatus of claim 2, further comprising:
   a discharge fan mounted inside of the discharge outlet and that generates a suction force for suctioning the air in through the suction inlet and discharging the suctioned air in through the discharge outlet; and
   a fan motor mounted underneath the discharge fan that rotates the discharge fan.

5. The portable air flow apparatus of claim 4, wherein the head comprises:
   a head main body in which the suction inlet and the discharge outlet are horizontally spaced apart from each other; and
   a flow path provided inside of the head main body, the air suctioned through the suction inlet flowing toward the discharge outlet along the flow path.

6. The portable air flow apparatus of claim 5, wherein the discharge outlet has a greater cross-sectional area than the flow path.

7. The portable air flow apparatus of claim 5, wherein the flow path comprises:
   an inlet open at a bottom and facing toward the suction inlet;
   an outlet open at a top and facing toward the discharge outlet; and
   an inner flow path through which the suction inlet and the outlet horizontally communicate with each other.

8. The portable air flow apparatus of claim 7, wherein an edge portion of an inner wall surface of the inner flow path has a rounded shape, a direction of flow of the air being changed at the edge portion.

9. The portable air flow apparatus of claim 5, further comprising:
   a filter unit mounted in the suction inlet and having at least one purification filter that purifies the air suctioned through the suction inlet.

10. The portable air flow apparatus of claim 9, wherein the head main body comprises:
    a casing main body having a flow path space in which the flow path is seated;
    an upper casing in which the discharge outlet is formed and which is coupled with the casing main body in a direction facing downward from over the casing main body to close the flow path space; and
    a lower casing in which a through-hole is formed, at a position corresponding to the suction inlet, that passes therethrough from top to bottom, and which is coupled with the casing main body in a direction of facing up from under the casing main body.

11. The portable air flow apparatus of claim 9, further comprising:
    a filter roll rotatably mounted in the casing main body, with an oil mist filter of the filter unit being wound thereon; and
    a filter transportation unit mounted in the casing main body, including a plurality of transportation rollers, and positioned in front of the filter roll with the suction inlet therebetween, and discharging the oil mist filter horizontally extending from the filter roll and passing the suction inlet, to an outside of the casing main body.

12. The portable air flow apparatus of claim 11, wherein a filter discharge hole through which the mist oil filter transported by the filter transportation unit passes therethrough from bottom to top is formed in the upper casing, and wherein the oil mist filter that passes the suction inlet and is connected to the filter transportation unit in a state of being inclined upward is transported upward by the filter transportation unit.

13. The portable air flow apparatus of claim 1, further comprising:
    a rotation unit that connects the column and the base such that the column is rotatable with respect to the base.

14. The portable air flow apparatus of claim 13, wherein the rotation unit comprises:
    a first rotation member mounted underneath the column; and
    a second rotation member mounted in the base and that rotatably supports the first rotation member in such a manner that the column is rotated.

15. The portable air flow apparatus of claim 14, wherein the first rotation member has a shape of a circular plate, and the second rotation member has a shape of a circular ring and is rotatably supported along an inner circumferential surface of the first rotation member.

16. The portable air flow apparatus of claim 15, wherein a blocking protrusion is provided on an outer circumferential surface of the first rotation member and radially protrudes outward therefrom, wherein a plurality of blocking grooves is formed in an inner circumferential surface of the second rotation member spaced apart by a predetermined angle, and wherein the blocking protrusion is inserted into one of the plurality of blocking grooves such that movement of the blocking protrusion is blocked by the one of the plurality of blocking grooves.

17. The portable air flow apparatus of claim 16, wherein the plurality of blocking grooves comprises three blocking grooves spaced apart by an angle of 90°, so that the base and the head are positioned aligned with each other and the head is rotated by an angle of 90° to the left or to the right with respect to the base.

18. The portable air flow apparatus of claim 17, wherein the rotation unit comprises:
   a control member coupled with the first rotation member; and
   a control groove formed in the base and formed in the plate-like surface in such a manner as to have a shape of a semicircle having an internal angle, wherein a control protrusion formed on the control member is rotated in a state of being inserted in the control groove within the internal angle by being blocked by the control groove.

19. The portable air flow apparatus of claim 1, wherein the column comprises:
   a first column having a shape of a cylinder, and a first side of which is coupled with the head;
   a second column having a shape of a cylinder and a first side of which is coupled with the base and a second side of which is inserted into a second side of the first column; and
   a height adjuster that enables the first column to ascend with respect to the second column such that a height of the head is adjusted.

20. The portable air flow apparatus of claim 19, wherein the height adjuster comprises:
   a rack mounted on one of the first column or the second column and formed along the vertical direction;
   a pinion rotated by being engaged with the rack; and
   a damper mounted on the other one of the first column or the second column and connected to a rotational shaft of the pinion, the damper enabling the first column to ascend when the pinion is rotated by being engaged with the rack and exerting a load in such a manner that a position to which the first column ascends is maintained.

* * * * *